(12) United States Patent
Ikriannikov

(10) Patent No.: US 9,281,115 B2
(45) Date of Patent: Mar. 8, 2016

(54) MULTI-TURN INDUCTORS

(71) Applicant: Volterra Semiconductor Corporation, San Jose, CA (US)

(72) Inventor: Alexandr Ikriannikov, Castro Valley, CA (US)

(73) Assignee: Volterra Semiconductor LLC, San Jose, CA (US)

(*) Notice: Subject to any disclaimer, the term of this patent is extended or adjusted under 35 U.S.C. 154(b) by 0 days.

(21) Appl. No.: 14/171,047

(22) Filed: Feb. 3, 2014

(65) Prior Publication Data

US 2014/0145688 A1    May 29, 2014

Related U.S. Application Data

(60) Division of application No. 13/269,273, filed on Oct. 7, 2011, now Pat. No. 8,674,802, which is a continuation-in-part of application No. 13/175,726, filed on Jul. 1, 2011, now Pat. No. 8,362,867, which is a division of application No. 12/643,957, filed on Dec. 21, 2009, now Pat. No. 7,994,888.

(51) Int. Cl.
*H01F 27/29* (2006.01)
*H01F 17/04* (2006.01)
(Continued)

(52) U.S. Cl.
CPC .......... *H01F 27/2852* (2013.01); *H01F 27/292* (2013.01); *H01F 27/306* (2013.01); *H02M 3/02* (2013.01); *H01F 27/2847* (2013.01)

(58) Field of Classification Search
CPC . H01F 27/292; H01F 27/2852; H01F 27/306; H01F 27/2847; H01F 27/29; H01F 5/04; H02M 3/02

USPC .................. 336/192, 221, 222, 182; 323/234
See application file for complete search history.

(56) References Cited

U.S. PATENT DOCUMENTS 2,170,446 A    8/1939    Edwards
2,212,543 A    8/1940    Jovy
(Continued)

FOREIGN PATENT DOCUMENTS

CN    101048830    10/2007
DE    37 03 561    8/1988
(Continued)

OTHER PUBLICATIONS

European Patent Application No. 10 801 317.6, Office Action dated Jul. 3, 2014, 5 pages.
(Continued)

*Primary Examiner* — Mangtin Lian
(74) *Attorney, Agent, or Firm* — Lathrop & Gage LLP

(57) ABSTRACT

A multi-winding inductor includes a first foil winding and a second foil winding. One end of the first foil winding extends from a first side of the core and wraps under the core to form a solder tab under the core. One end of the second foil winding extends from a second side of the core and wraps under the core to form another solder tab under the core. Respective portions of each solder tab are laterally adjacent under the magnetic core. A coupled inductor includes a magnetic core including a first and a second end magnetic element and a plurality of connecting magnetic elements disposed between and connecting the first and second end magnetic elements. A respective first and second single turn foil winding is wound at least partially around each connecting magnetic element. Each foil winding has two ends forming respective solder tabs.

5 Claims, 31 Drawing Sheets

(51) Int. Cl.
- *G05F 1/10* (2006.01)
- *H01F 27/28* (2006.01)
- *H01F 27/30* (2006.01)
- *H02M 3/02* (2006.01)

(56) References Cited

U.S. PATENT DOCUMENTS

| | | |
|---|---|---|
| 2,298,935 A | 10/1942 | Freeman |
| 3,185,947 A | 5/1965 | Freymodsson |
| 3,671,847 A | 6/1972 | Shibano |
| 3,878,495 A | 4/1975 | Thomas |
| 4,455,545 A | 6/1984 | Shelly |
| 4,488,136 A | 12/1984 | Hansen et al. |
| 4,531,085 A | 7/1985 | Mesenhimer |
| 4,543,554 A | 9/1985 | Muellenheim et al. |
| 4,636,752 A | 1/1987 | Saito |
| 4,975,671 A | 12/1990 | Dirks |
| 5,003,277 A | 3/1991 | Sokai et al. |
| 5,123,989 A | 6/1992 | Horiishi et al. |
| 5,161,098 A | 11/1992 | Balakrishnan |
| 5,177,460 A | 1/1993 | Dhyanchand et al. |
| 5,182,535 A | 1/1993 | Dhyanchand |
| 5,204,809 A | 4/1993 | Andresen |
| 5,225,971 A | 7/1993 | Spreen |
| 5,436,818 A | 7/1995 | Barthold |
| 5,469,334 A | 11/1995 | Balakrishnan |
| 5,525,951 A | 6/1996 | Sunano et al. |
| 5,565,837 A | 10/1996 | Godek et al. |
| 5,568,111 A | 10/1996 | Metsler |
| 5,574,420 A | 11/1996 | Roy et al. |
| 5,737,203 A | 4/1998 | Barrett |
| 5,764,500 A | 6/1998 | Matos |
| 5,939,966 A | 8/1999 | Shin' Ei |
| 6,018,468 A | 1/2000 | Archer et al. |
| 6,060,977 A | 5/2000 | Yamamoto et al. |
| 6,114,932 A | 9/2000 | Wester et al. |
| 6,147,584 A | 11/2000 | Shin'ei |
| 6,198,375 B1 | 3/2001 | Shafer |
| 6,204,744 B1 | 3/2001 | Shafer et al. |
| 6,304,460 B1 | 10/2001 | Cuk |
| 6,342,778 B1 | 1/2002 | Catalano et al. |
| 6,348,848 B1 | 2/2002 | Herbert |
| 6,356,179 B1 | 3/2002 | Yamada |
| 6,362,986 B1 | 3/2002 | Schultz et al. |
| 6,377,155 B1 | 4/2002 | Allen et al. |
| 6,449,829 B1 | 9/2002 | Shafer |
| 6,460,244 B1 | 10/2002 | Shafer et al. |
| 6,549,111 B1 | 4/2003 | De Graaf et al. |
| 6,578,253 B1 | 6/2003 | Herbert |
| 6,714,428 B2 | 3/2004 | Huang et al. |
| 6,737,951 B1 | 5/2004 | Decristofaro et al. |
| 6,774,758 B2 | 8/2004 | Gokahle et al. |
| 6,784,644 B2 | 8/2004 | Xu et al. |
| 6,856,230 B2 | 2/2005 | Lu |
| 6,867,678 B2 | 3/2005 | Yang |
| 6,885,274 B2 | 4/2005 | Hsu et al. |
| 6,903,648 B2 | 6/2005 | Baumann et al. |
| 6,922,883 B2 | 8/2005 | Gokahle et al. |
| 6,965,290 B2 | 11/2005 | Gokahle et al. |
| 6,980,077 B1 | 12/2005 | Chandrasekaran et al. |
| 7,023,314 B2 | 4/2006 | Tolle et al. |
| 7,034,645 B2 | 4/2006 | Shafer et al. |
| 7,187,263 B2 | 3/2007 | Vinciarelli |
| 7,199,695 B1 | 4/2007 | Zhou et al. |
| 7,233,132 B1 | 6/2007 | Dong et al. |
| 7,239,530 B1 | 7/2007 | Djekic et al. |
| 7,248,139 B1 | 7/2007 | Podlisk et al. |
| 7,259,648 B2 | 8/2007 | Matsutani et al. |
| 7,280,025 B2 | 10/2007 | Sano |
| 7,292,128 B2 | 11/2007 | Hanley |
| 7,310,039 B1 | 12/2007 | Zhang |
| 7,315,463 B2 | 1/2008 | Schrom et al. |
| 7,317,305 B1 | 1/2008 | Stratakos et al. |
| 7,352,269 B2 | 4/2008 | Li et al. |
| 7,492,246 B2 | 2/2009 | Chang |
| 7,498,920 B2 | 3/2009 | Sullivan et al. |
| 7,504,808 B2 | 3/2009 | Schrom et al. |
| 7,525,406 B1 | 4/2009 | Cheng |
| 7,525,408 B1 | 4/2009 | Li et al. |
| 7,548,046 B1 | 6/2009 | Stratakos et al. |
| 7,567,163 B2 | 7/2009 | Dadafshar et al. |
| 7,880,577 B1 | 2/2011 | Glaser et al. |
| 2001/0043135 A1 | 11/2001 | Yamada et al. |
| 2002/0067234 A1* | 6/2002 | Kung .............. 336/192 |
| 2002/0093413 A1 | 7/2002 | Shin'ei |
| 2004/0017276 A1 | 1/2004 | Chen et al. |
| 2004/0085173 A1 | 5/2004 | Decristofaro et al. |
| 2005/0024179 A1 | 2/2005 | Chandrasekaran et al. |
| 2005/0128040 A1 | 6/2005 | Gray et al. |
| 2006/0049907 A1 | 3/2006 | Liu |
| 2006/0089022 A1 | 4/2006 | Sano |
| 2006/0145800 A1 | 7/2006 | Dadafshar et al. |
| 2006/0145804 A1 | 7/2006 | Matsutani et al. |
| 2006/0158297 A1 | 7/2006 | Sutardja |
| 2006/0197510 A1 | 9/2006 | Chandrasekaran |
| 2007/0175701 A1 | 8/2007 | Xu et al. |
| 2007/0176726 A1 | 8/2007 | Xu et al. |
| 2007/0268104 A1 | 11/2007 | Chan et al. |
| 2008/0024259 A1 | 1/2008 | Chandrasekaran et al. |
| 2008/0136576 A1 | 6/2008 | Emmons et al. |
| 2008/0150666 A1 | 6/2008 | Chandrasekaran et al. |
| 2008/0169769 A1 | 7/2008 | Lee |
| 2008/0205098 A1 | 8/2008 | Xu et al. |
| 2008/0303624 A1 | 12/2008 | Yamada et al. |
| 2009/0179723 A1 | 7/2009 | Ikriannikov et al. |
| 2009/0231081 A1 | 9/2009 | Ikriannikov et al. |
| 2009/0237197 A1 | 9/2009 | Ikriannikov et al. |
| 2010/0007457 A1 | 1/2010 | Yan et al. |
| 2010/0013587 A1 | 1/2010 | Yan et al. |
| 2010/0271161 A1 | 10/2010 | Yan et al. |
| 2011/0018669 A1 | 1/2011 | Ikriannikov |
| 2011/0032068 A1 | 2/2011 | Ikriannikov |
| 2011/0035607 A1 | 2/2011 | Ikriannikov |
| 2011/0043317 A1 | 2/2011 | Ikriannikov |
| 2012/0056704 A1 | 3/2012 | Nagano et al. |
| 2012/0134180 A1 | 5/2012 | Watanabe et al. |

FOREIGN PATENT DOCUMENTS

| | | |
|---|---|---|
| EP | 0 012 629 | 6/1980 |
| EP | 0 142 207 | 5/1985 |
| EP | 1 519 392 | 3/2005 |
| EP | 1 632 964 | 3/2006 |
| EP | 1 833 165 | 9/2007 |
| EP | 1 835 604 | 9/2007 |
| EP | 1 950 773 | 7/2008 |
| JP | 60-015908 | 1/1985 |
| JP | 08-250332 | 9/1996 |
| JP | 2000-164431 | 6/2000 |
| JP | 2002057049 | 2/2002 |
| JP | 2004119682 | 4/2004 |
| JP | 2005310865 | 11/2005 |
| WO | WO 2006/026674 | 3/2006 |
| WO | WO 2009/059069 | 5/2009 |
| WO | WO 2010/014444 | 2/2010 |

OTHER PUBLICATIONS

European Patent Application No. 10 801 317.6, Response to Office Action filed Oct. 24, 2014, 27 pages.

Chinese Patent App. No. 201080062014.6, Office Action Dated Jan. 30, 2014 and partial summary thereof, 12 pages.

Chinese Patent App. No. 201080062014.6, Office Action Dated Sep. 29, 2014 and partial summary thereof, 13 pages.

Chinese Patent App. No. 201080062014.6, Office Action Dated Mar. 23, 2015 and partial summary thereof, 15 pages.

Dong et al., Twisted Core Coupled Inductors for Microprocessor Voltage Regulators, Power Electronics Specialists Conference, pp. 2386-2392, Jun. 17-21, 2007.

Dong et al., The Short Winding Path Coupled Inductor Voltage Regulators, Applied Power Electronics Conference and Exposition, pp. 1446-1452, Feb. 24-28, 2008.

(56) References Cited

OTHER PUBLICATIONS

Dong et al., Evaluation of Coupled Inductor Voltage Regulators, Applied Power Electronics Conference and Exposition, pp. 831-837, Feb. 24-28, 2008.
Panasonic, Power Choke Coil, 2 pages, Jan. 2008.
Pulse, SMT Power Inductors datasheet, 2 pages, Nov. 2007.
Pulse, SMT Power Inductors Power Beads—PA0766NL Series; pp. 53-55; Mar. 2006.
Wong, Pit-Leong, et al., "Investigating Coupling Inductors in the Interleaving QSW VRM" Applied Power Electronics Conference and Exposition, 2000. APEC 2000. Fifteenth Annual IEEE; Mar. 2000; pp. 973-978.
Wong, Pit-Leong, et al.; A Novel Modeling Concept for Multi-coupling Core Structures; Center for Power Electronics Systems; IEEE, 7 pages.
Wong, Pit-Leong, et al.; Performance Improvements of Interleaving VRMs With Coupling Inductors, IEEE Transactions on Power Electronics; vol. 16, No. 4; pp. 499-507; Jul. 2001.
Vishay, Low Profile, High Current IHLP Inductor, 3 pages, Jan. 21, 2009.
Vitec, Dual High Frequency High Power Inductor, AF4390A data sheet; date unknown.
Xu, J., et al; Analysis by Finite Element Method of a Coupled Inductor Circuit Used as Current Injection Interface; IEEE; pp. 147-151; 1996.
Cooper Bussmann, "Product Data Sheet for Low Profile Inductor (Surface Mount)" retrieved from http://www.angliac.com, May 2003.
Pulse Product News Press Release dated Nov. 25, 2008, 1 page.
Chandrasekaran, S. et al., "Integrated Magnetics for Interleaved DC-DC Boost for Fuel Cell Powered Vehicles," 35th Annual IEEE Power Electronics Specialists Conferences, 356-61 (2004).
U.S. Appl. No. 12/507,751, Response to Office Action filed May 23, 2011, 23 pages.
U.S. Appl. No. 12/507,751, Non-Final Rejection mailed Feb. 23, 2011, 11 pages.
U.S. Appl. No. 12/507,751, Notice of Allowance mailed Jul. 6, 2011, 12 pages.
U.S. Appl. No. 12/507,751, Issue Fee Payment filed Sep. 12, 2011, 2 pages.
PCT/US10/60869, International Search Report and Written Opinion mailed May 13, 2011, 14 pages.
U.S. Appl. No. 12/643,957.
Notice of Allowance issued in U.S. Appl. No. 12/940,933, dated Jun. 27, 2012, 8 pages.
U.S. Appl. No. 12/786,316, Issue Fee Payment of Apr. 3, 2012, 2 pages.
PCT/US11/59193, International Search Report and Written Opinion of Mar. 27, 2012, 9 pages.
U.S. Appl. No. 13/175,726, Notice of Allowance issued Sep. 21, 2012, 8 pages.
U.S. Appl. No. 13/175,726, Issue Fee payment filed Dec. 21, 2012, 2 pages.
U.S. Appl. No. 13/175,726, Non-Final Rejection issued May 30, 2012, 7 pages.
U.S. Appl. No. 13/175,726, Amendment and Response to Office Action filed Aug. 30, 2012, 15 pages.
U.S. Appl. No. 13/269,273, Non-Final Rejection issued May 17, 2013, 14 pages.
U.S. Appl. No. 13/269,273, Amendment and Response to Office Action filed Sep. 17, 2013, 16 pages.
U.S. Appl. No. 13/269,273, Notice of Allowance issued Oct. 23, 2013, 14 pages.
European Patent Application No. 10 801 317.8, Response to R. 161/162 Communication, filed Feb. 21, 2013, 5 pages.

* cited by examiner

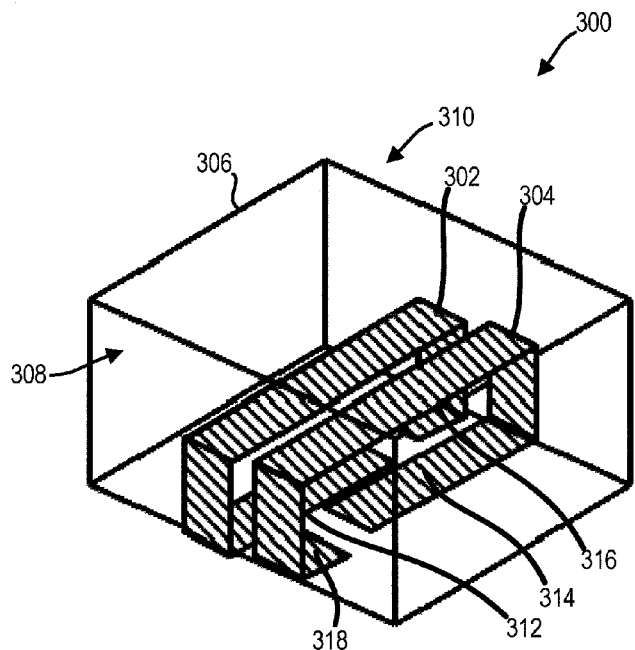
FIG. 3
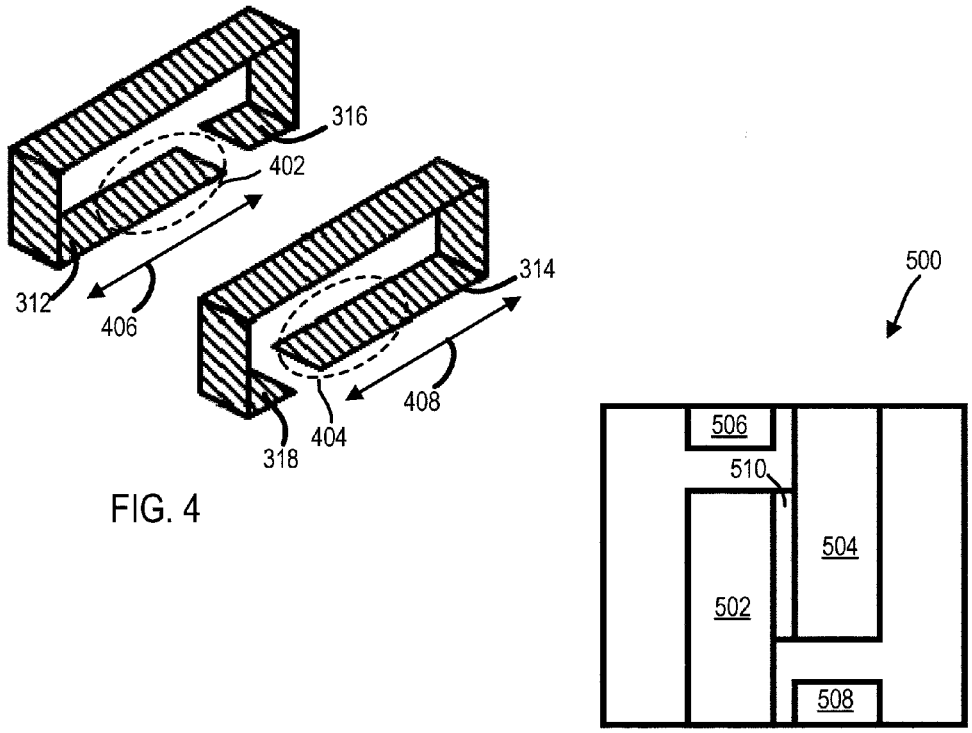
FIG. 4
FIG. 5

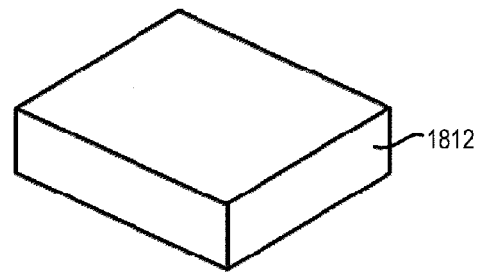
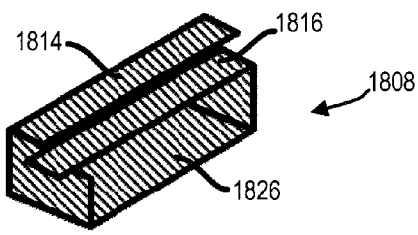
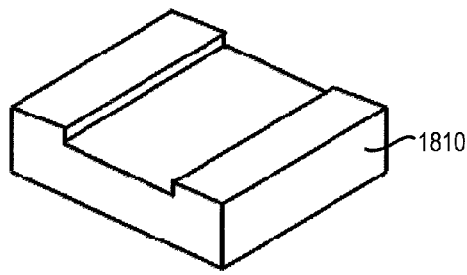
FIG. 20
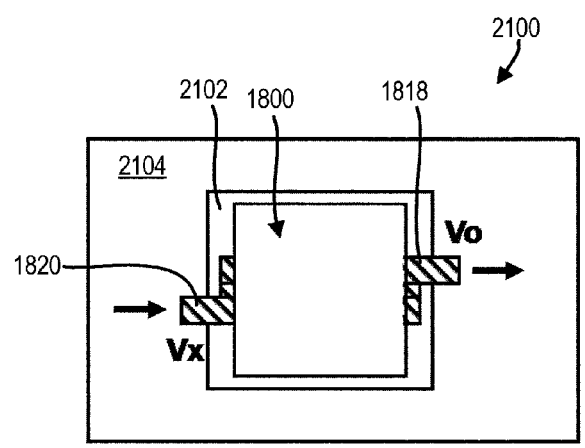
FIG. 21
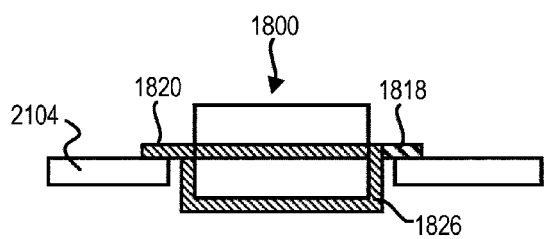
FIG. 22

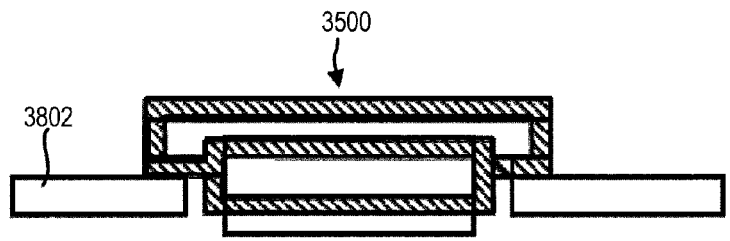
FIG. 38
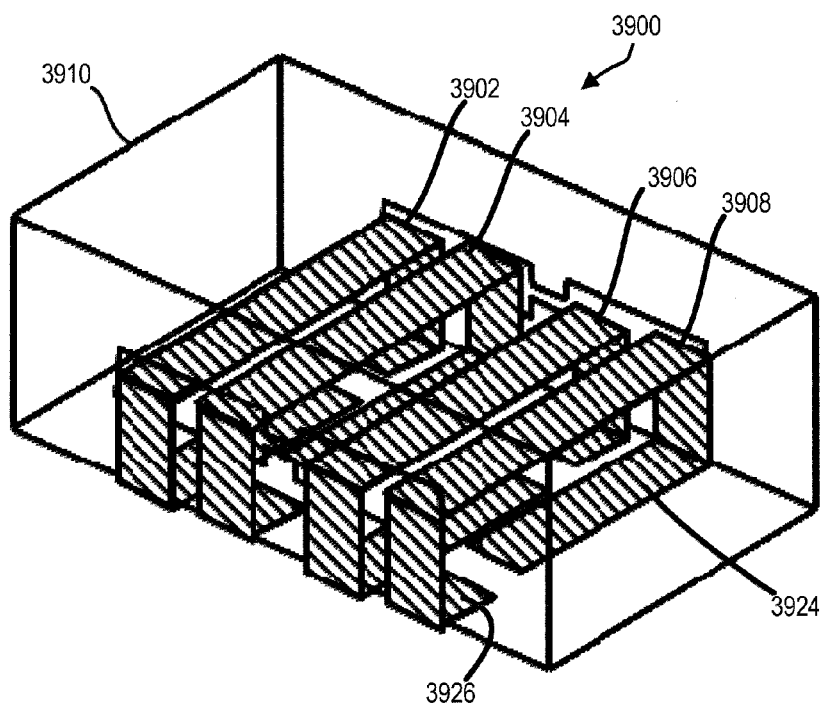
FIG. 39
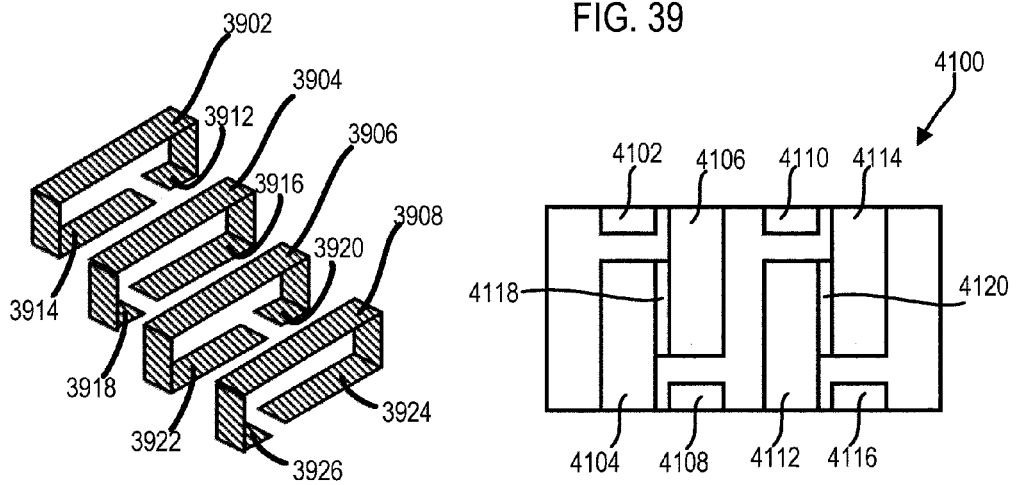
FIG. 40
FIG. 41

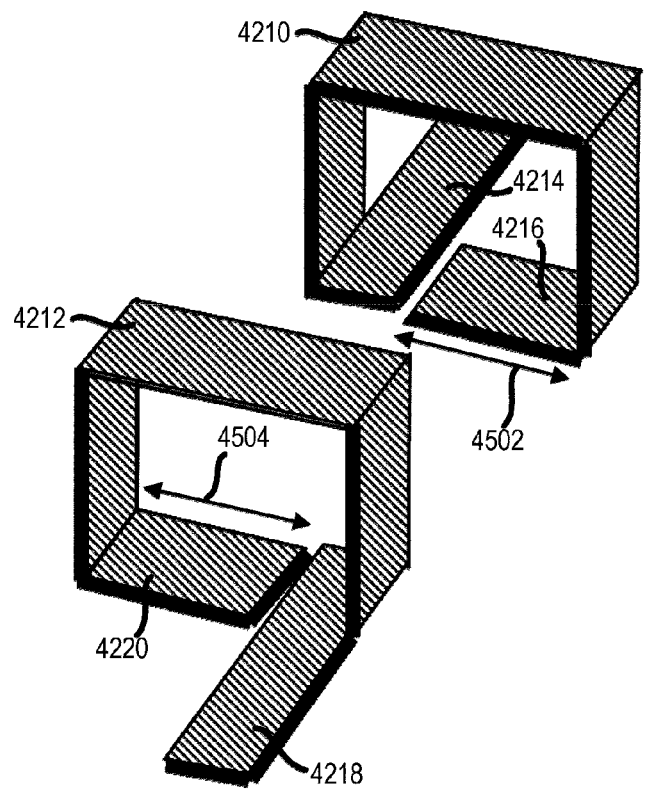
FIG. 45
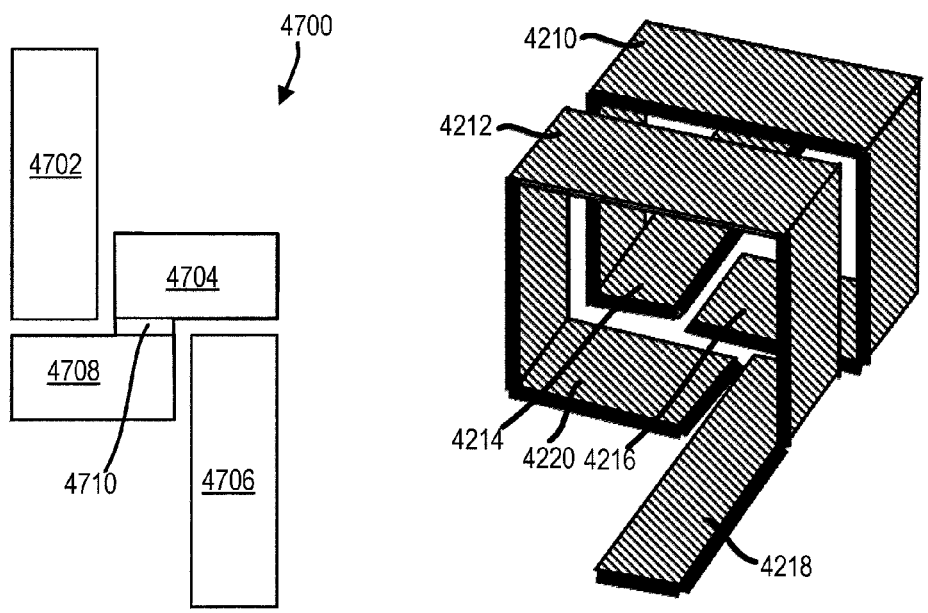
FIG. 47
FIG. 46

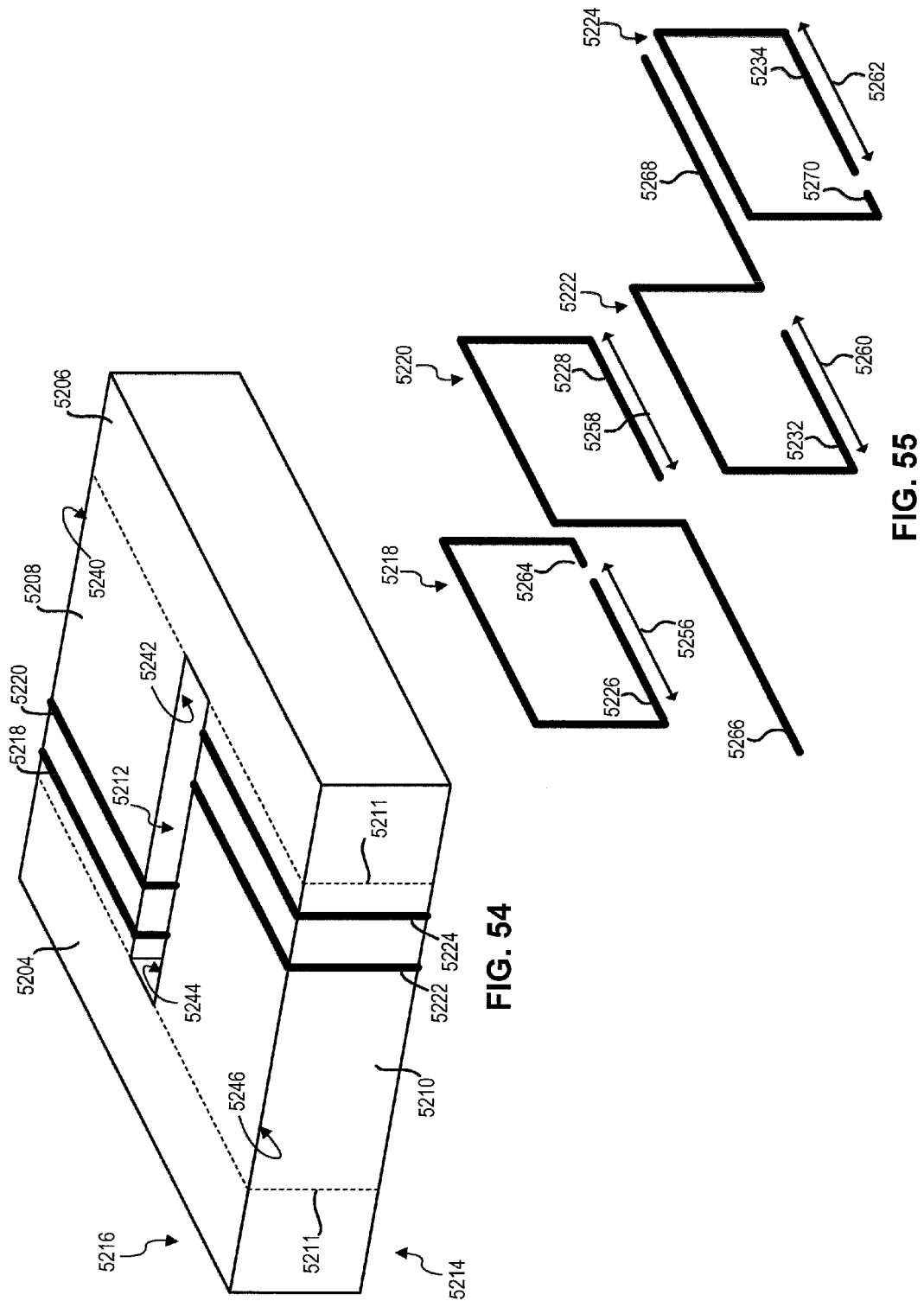

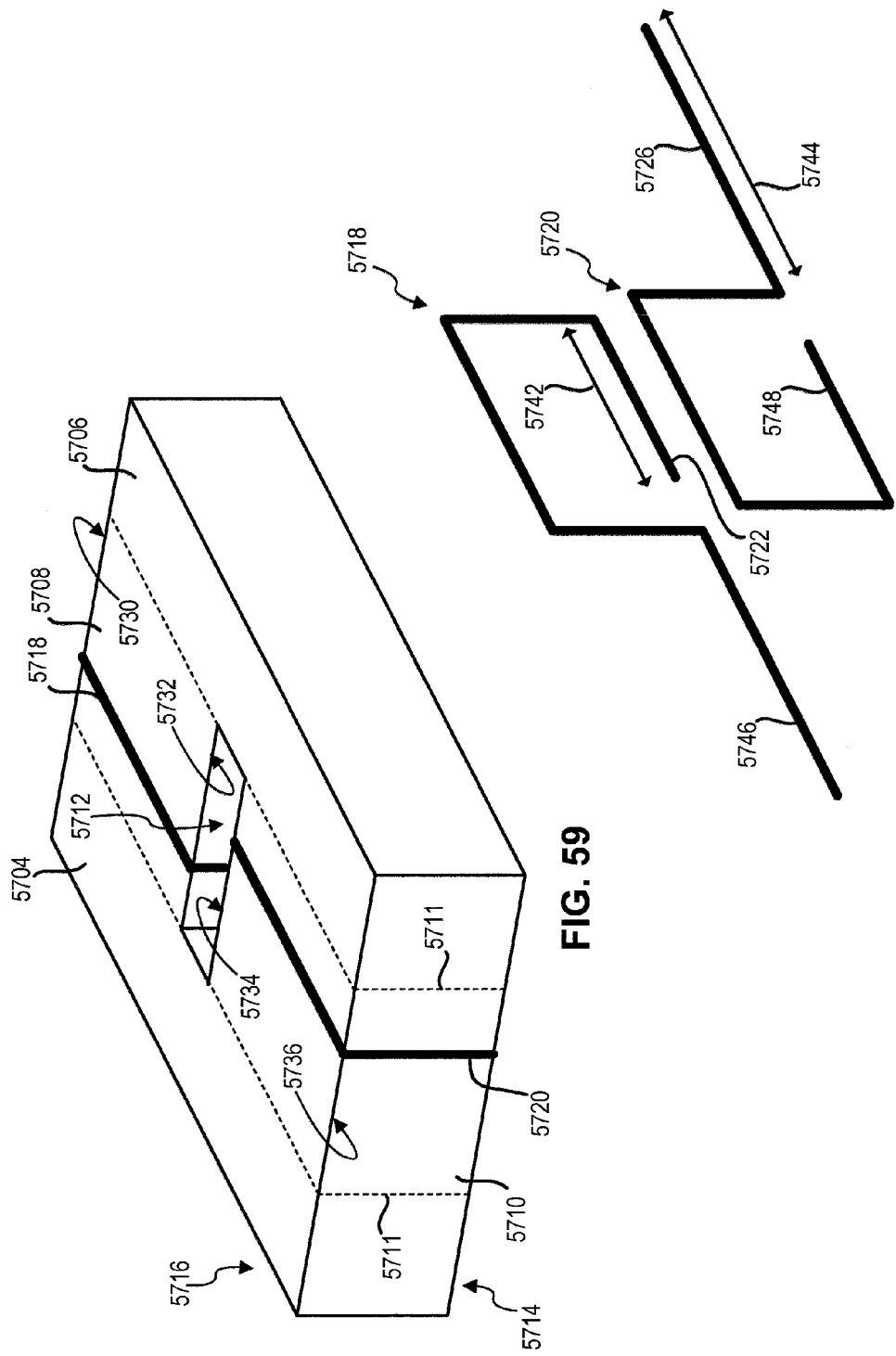

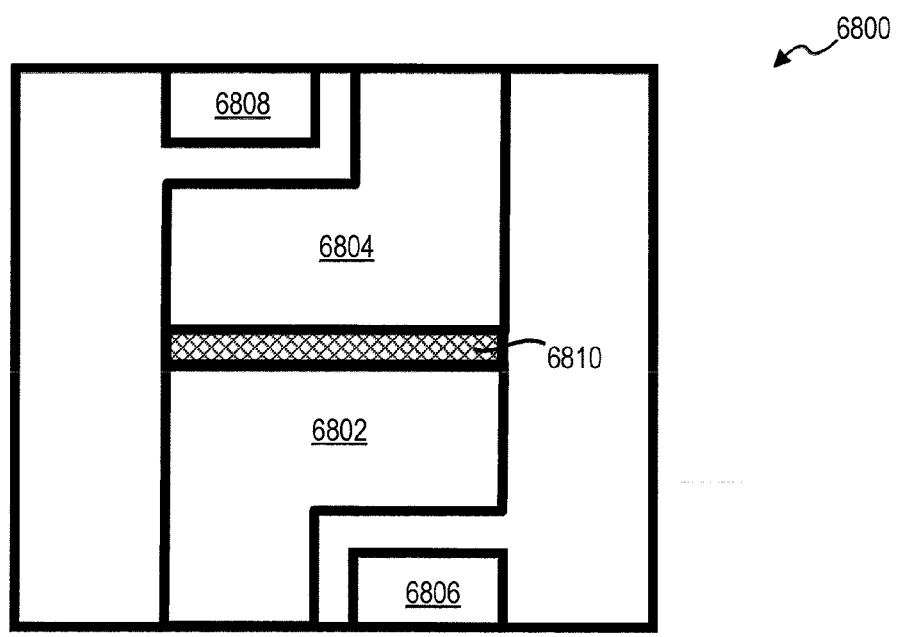
FIG. 68
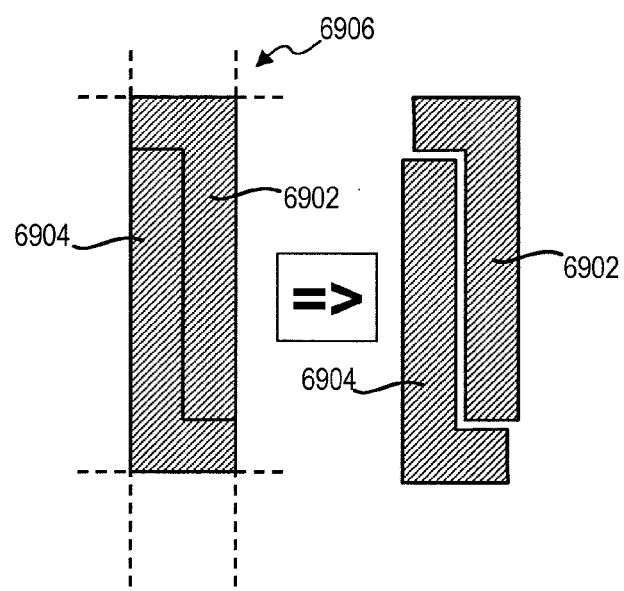
FIG. 69A　　FIG. 69B

MULTI-TURN INDUCTORS

RELATED APPLICATIONS

This application is a divisional of U.S. patent application Ser. No. 13/269,273 filed Oct. 7, 2011, which is a continuation in part of U.S. patent application Ser. No. 13/175,726 filed Jul. 1, 2011, now U.S. Pat. No. 8,362,867, which is a divisional of U.S. patent application Ser. No. 12/643,957 filed Dec. 21, 2009, now U.S. Pat. No. 7,994,888. Each of the above mentioned patent applications is incorporated herein by reference.

BACKGROUND

Switching power converters, such as switching DC-to-DC converters, are known. Switching power converters typically have a higher efficiency and a smaller size than linear power converters with corresponding power ratings. Accordingly, switching power converters are widely used in applications requiring small size and/or high efficiency, such as in battery powered portable electronic devices.

Many switching power converters require one or more inductors for temporary storage of energy during each converter switching cycle. One example of a switching power converter requiring an inductor is a buck DC-to-DC converter, which requires at least one inductor. Switching power converter inductors typically handle large magnitude, high frequency alternating currents. Accordingly, significant power is lost in the inductors due to factors including winding resistive power losses, which increase with the square of winding current, and core losses, which increase with increasing switching converter operating frequency. Inductor power loss is undesirable, particularly in battery powered portable applications, where it is desirable to conserve battery power and minimize use of cooling components such as heat sinks and/or fans to remove heat resulting from the power loss.

One known inductor commonly employed in switching converters includes a single-turn "staple" winding wound through a ferrite magnetic core. This single-turn inductor advantageously has a relatively low cost and winding resistance. The ferrite material also exhibits low core losses at high operating frequencies relative to other core materials, such as powdered iron. However, this single-turn inductor may not be suitable for applications requiring small inductor size, particularly when a large inductance value and/or high efficiency are required. Inductance of such an inductor is directly proportional to core cross sectional area, and core losses are indirectly proportional to core cross sectional area. Accordingly, for a given core material and winding configuration, core cross sectional area may be increased to increase inductance and/or decrease core losses. But, increasing core cross sectional area correspondingly increases physical inductor size (e.g., height). Large inductors are undesirable or unacceptable in many applications, such as in space constrained portable device applications. Increasing core cross sectional area also generally increases inductor cost.

A single-turn inductor typically has an air-gap in its core, and inductance can also be increased by decreasing thickness of such gap. However, decreasing the gap's thickness correspondingly increases core magnetic flux density, which typically increases core losses. Core losses generally increase as flux density increases, such as in proportion to the square or even the cube of flux density. Accordingly, core losses may rapidly increase as the gap's thickness is decreased. Additionally, small gap thickness results in the inductor saturating at relatively low currents, thereby limiting the inductor's maximum operating current.

Some drawbacks of a single-turn inductor can be overcome by increasing the number of turns to two or more. Inductance is proportional to the square of number of turns. Additionally, increasing the number of turns allows for a core's air gap thickness to be increased while maintaining the same inductance value, thereby lowering magnetic flux density and associated core losses. Accordingly, increasing the number of turns can increase inductance or decreases core losses without increasing core cross sectional area. However, present multi-turn inductors typically suffer from problems such as being difficult and costly to manufacture and/or having a high winding resistance.

There have been attempts to produce low cost multi-turn inductors. For example, FIG. 1 shows a perspective view of one prior art surface mount inductor 100 including a rectangular magnetic core 102 and two single-turn staple windings 104, 106 wound through magnetic core 102. Only the outline of core 102 is shown in FIG. 1 so that windings 104, 106 are visible. Inductor 100 can be configured as a two-turn inductor by electrically connecting together windings 104, 106 in series. For example, solder tabs 108, 110 may be electrically connected together in series using a printed circuit board ("PCB") trace underlying the inductor such that windings 104, 106 are electrically connected in series and solder tabs 112, 114 provide an electrical interface to each end of the series connected windings. Each winding 104, 106 has a DC resistance of 0.52 milliohm, for example. Single-turn staple windings are typically inexpensive to manufacture, and inductor 100 is therefore typically inexpensive to manufacture, even though inductor 100 can be configured as a two-turn inductor. However, the configuration of inductor 100 results in high resistive power losses in typical applications.

For example, FIG. 2 is a top plan view of one printed circuit board footprint 200 for use with inductor 100 in a two-turn configuration. Footprint 200 includes pads 202, 204, 206, 208 for respectively connecting to solder tabs 108, 110, 112, 114 of windings 104, 106. Pads 202, 204 are electrically connected together via a PCB trace 210. PCB trace 210 is typically a thin copper foil having a relatively high resistance. For example, PCB traces in portable, high density applications are commonly formed of "1 ounce" copper foil, which has thickness of about 35 microns. In one representative configuration, PCB trace 210 has a resistance of approximately 0.6 milliohm between pads 202, 204, which is larger than the DC resistance of each winding 104, 106. Accordingly, although inductor 100 can be configured as a two-turn surface mount inductor, significant power will be lost due to high resistance of PCB trace 210 required to connect windings 104, 106 in series.

SUMMARY

In an embodiment, a multi-winding inductor includes a magnetic core having a first side opposite a second side, a first foil winding, and a second foil winding. The first foil winding passes through the magnetic core from the first side to the second side, and a first end of the first foil winding extends from the first side of the core and wraps under the core to form a first solder tab under the core suitable for surface mount soldering to a printed circuit board. A second end of the first foil winding extends from the second side of the core to form a second solder tab suitable for surface mount soldering to a printed circuit board. The second foil winding passes through the magnetic core from the first side to the second side, and a first end of the second foil winding extends from the second side of the core and wraps under the core to form a third solder tab under the core suitable for surface mount soldering to a printed circuit board. A second end of the second foil winding extends from the first side of the core to form a fourth solder tab suitable for surface mount soldering to a printed circuit board. A portion of the first solder tab is laterally adjacent to a portion of the third solder tab under the magnetic core.

In an embodiment, a multi-turn inductor includes a magnetic core having a first side opposite a second side and a multi-turn foil winding. The multi-turn foil winding includes a first foil interconnect and a first and a second foil portion each passing through the magnetic core from the first side to the second side. A first end of the first foil portion extends from the second side of the core to form a first solder tab suitable for surface mount soldering to a printed circuit board. The first foil interconnect wraps under to core to electrically couple a second end of the first foil portion extending from the first side of the core to a first end of the second foil portion extending from the second side of the core.

In an embodiment, a multi-turn drop-in inductor for installing in a printed circuit board aperture includes a multi-turn foil winding and magnetic core having a first side opposite a second side. The multi-turn foil winding includes a first foil interconnect and a first and a second foil portion, each foil portion passing through the magnetic core from the first side to the second side. A first end of the first foil portion extends from the second side of the core to form a first solder tab suitable for surface mount soldering to a printed circuit board. A second end of the second foil portion extends from the first side of the core to form a second solder tab suitable for surface mount soldering to a printed circuit board. The first and second solder tabs are disposed at a common height relative to and displaced from a bottom surface of the magnetic core. The first foil interconnect wraps under the core to electrically couple a second end of the first foil portion extending from the first side of the core to a first end of the second foil portion extending from the second side of the core.

In an embodiment, a coupled inductor includes a magnetic core including a first and a second end magnetic element and N connecting magnetic elements disposed between and connecting the first and second end magnetic elements. N is an integer greater than one. A respective set of single-turn foil windings is wound at least partially around each connecting magnetic element. Each set of single turn-foil windings includes a first single-turn foil winding and a second single-turn foil winding. The first single-turn foil winding has a first end and a second end respectively forming a first and a second solder tab, and the second single-turn foil winding has a first end and a second end respectively forming a third and a fourth solder tab. A portion of the second solder tab is laterally adjacent to a portion of the third solder tab.

In an embodiment, a power supply includes a printed circuit board, an inductor affixed to the printed circuit board, and a switching circuit affixed to the printed circuit board. The inductor includes a magnetic core having a first side opposite a second side, a first foil winding passing through the magnetic core from the first side to the second side, and a second foil winding passing through the magnetic core from the first side to the second side. A first end of the first foil winding extends from the first side of the core and wraps under the core to form a first solder tab under the core that is surfaced mount soldered to the printed circuit board. A second end of the first foil winding extends from the second side of the core to form a second solder tab that is surface mount soldered to the printed circuit board. A first end of the second foil winding extends from the second side of the core and wraps under the core to form a third solder tab under the core that is surface mount soldered to the printed circuit board. A second end of the second foil winding extends from the first side of the core to form a fourth solder tab that is surface mount soldered to the printed circuit board. A portion of the first solder tab is laterally adjacent to a portion of the third solder tab under the magnetic core, and the first and third solder tabs are electrically connected by a first trace of the printed circuit board. The switching circuit is electrically connected to the second solder tab by a second trace of the printed circuit board, and the switching circuit is configured and arranged to switch the second solder tab between at least two different voltages.

In an embodiment, a power supply includes a printed circuit board, a coupled inductor affixed to the printed circuit board, and N switching circuits affixed to the printed circuit board, where N is an integer greater than one. The coupled inductor includes a magnetic core including a first and a second end magnetic element and N connecting magnetic elements disposed between and connecting the first and second end magnetic elements. The coupled inductor further includes a respective set of single-turn foil windings wound at least partially around each connecting magnetic element. Each set of single turn-foil windings includes a first single-turn foil winding having a first end and a second end respectively forming a first and a second solder tab. Each set of single-turn foil findings further includes a second single-turn foil winding having a first end and a second end respectively forming a third and a fourth solder tab. A portion of the second solder tab is laterally adjacent to a portion of the third solder tab. Each switching circuit is electrically connected to a first solder tab of a respective set of single-turn foil windings by a respective trace of the printed circuit board. Each switching circuit is configured and arranged to switch the first solder tab of its respective set of single-turn foil windings between at least two different voltages.

In an embodiment, a power supply includes a printed circuit board, a drop-in inductor installed in an aperture of the printed circuit board, and a switching circuit affixed to the printed circuit board. The drop-in inductor includes a multi-turn foil winding and a magnetic core having a first side opposite a second side. The multi-turn foil winding includes a first foil interconnect and a first and a second foil portion, each foil portion passing through the magnetic core from the first side to the second side. A first end of the first foil portion extends from the second side of the core to form a first solder tab that is surface mount soldered to the printed circuit board. A second end of the second foil portion extends from the first side of the core to form a second solder tab that is surface mount soldered to the printed circuit board. The first and second solder tabs are disposed at a common height relative to and displaced from a bottom surface of the magnetic core. The first foil interconnect wraps under the core to electrically couple a second end of the first foil portion extending from the first side of the core to a first end of the second foil portion extending from the second side of the core. The switching circuit is electrically connected to the first solder tab by a trace of the printed circuit board, and the switching circuit is configured and arranged to switch the first solder tab between at least two different voltages.

In an embodiment, an inductor includes a magnetic core, and first, second, third, and fourth windings. The magnetic core includes first and second end magnetic elements and first and second legs each connected to at least one respective portion of both of the first and second end magnetic elements. The first and second windings are each wound around the first leg. A first end of the first winding forms a first solder tab on a bottom surface of the first leg, and a first end of the second winding forms a second solder tab on the bottom surface of the first leg. The third and fourth windings are each wound around the second leg. A first end of the third winding forms a third solder tab on a bottom surface of the second leg, and a first end of the fourth winding forms a fourth solder tab on the bottom surface of the second leg. One possible application of the inductor is in a power supply including a printed circuit board, a first printed circuit board trace electrically coupling the first and second solder tabs, and a second printed circuit board trace electrically coupling the third and fourth solder tabs.

In an embodiment, an inductor includes a magnetic core, and first, second, third, and fourth windings. The magnetic core has a passageway at least partially defined by first and second legs of the magnetic core, and the first and second legs oppose each other cross the magnetic core. The first and second windings are wound around the first leg. A first end of the first winding forms a first solder tab, and a first end of the second winding forms a second solder tab. The first solder tab has a first elongated portion adjacent to a second elongated portion of the second solder tab. The third and fourth windings are wound around the second leg. A first end of the third winding forms a third solder tab, and a first end of the fourth winding forms a fourth solder tab. The third solder tab has a third elongated portion adjacent to a fourth elongated portion of the fourth solder tab. One possible application of the inductor is in a power supply including a printed circuit board, a first printed circuit board trace electrically coupling the first and second solder tabs, and a second printed circuit board trace electrically coupling the third and fourth solder tabs.

In an embodiment, an inductor includes a magnetic core, a first winding, and a second winding. The magnetic core includes first and second end magnetic elements and first and second legs each connected to at least one respective portion of both the first and second end magnetic elements. The first winding is wound around the first leg, and first end of the first winding forms a first solder tab on a bottom surface of the first leg. The second winding is wound around the second connecting magnetic element, and a first end of the second winding forms a second solder tab on the bottom surface of the first leg. One possible application of the inductor is in a power supply including a printed circuit board and a first printed circuit board trace electrically coupling the first and second solder tabs.

In an embodiment, an inductor includes a magnetic core having a first outer side, a second outer side opposite to the first outer side, and a bottom side between the first and second outer sides. The inductor further includes a first and second winding each wound around at least a portion of the magnetic core. A first end of the first winding wraps around the first outer side of the magnetic core to form a first solder tab on the bottom side of the magnetic core. The first solder tab has an axis of elongation parallel to a lengthwise direction of the first outer side of the magnetic core. A first end of the second winding wraps around the second outer side of the magnetic core to form a second solder tab on the bottom side of the magnetic core. The second solder tab has an axis of elongation parallel to a lengthwise direction of the second outer side of the magnetic core. One possible application of the inductor is in a power supply including a printed circuit board and a printed circuit board trace electrically coupling the first and second solder tabs.

BRIEF DESCRIPTION OF DRAWINGS

FIG. 3 shows a perspective view of one two-winding inductor configurable as a two-turn inductor, according to an embodiment.

FIG. 4 shows a perspective view of the windings of the inductor of FIG. 3.

FIG. 5 is a top plan view of one PCB footprint for use with the inductor of FIG. 3, according to an embodiment.

FIG. 20 shows an exploded perspective view of the inductor of FIG. 18.

FIG. 21 is a top plan view of one printed circuit assembly including the inductor of FIG. 18, according to an embodiment.

FIG. 22 shows a cross-sectional view of the printed circuit assembly of FIG. 21.

FIG. 38 is a cross-sectional view of the inductor of FIG. 35 when installed in an aperture of a PCB, according to an embodiment.

FIG. 39 shows a perspective view of one multi-winding inductor configurable as a two-turn coupled inductor, according to an embodiment.

FIG. 40 shows a perspective view of the windings of the inductor of FIG. 39.

FIG. 41 is a top plan view of one PCB footprint that may be used with the inductor of FIG. 39, according to an embodiment.

FIGS. 45 and 46 show perspective views of the windings of the coupled inductors of FIG. 42.

FIG. 47 shows one PCB footprint that may be used with the coupled inductor of FIG. 42, according to an embodiment.

FIG. 54 shows a top perspective view of the inductor of FIG. 52.

FIG. 55 shows a perspective view of the windings of the inductor of FIG. 52.

FIG. 59 shows a top perspective view of the inductor of FIG. 57.

FIG. 60 shows a perspective view of the windings of the inductor of FIG. 57.

FIG. 68 is a top plan view of one PCB footprint for use with the inductor of FIG. 66, according to an embodiment.

FIGS. 69A and 69B show one method of forming solder tabs similar to those of the FIG. 66 inductor, according to an embodiment.

DETAILED DESCRIPTION OF THE EMBODIMENTS

Figure 1:
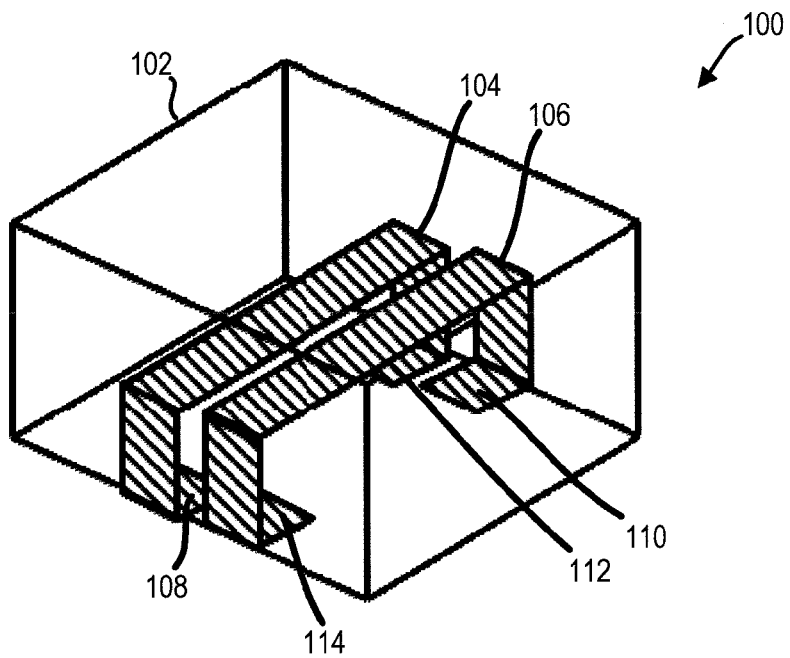
FIG. 1 shows a perspective view of one prior art surface mount inductor.

It is noted that, for purposes of illustrative clarity, certain elements in the drawings may not be drawn to scale. Specific instances of an item may be referred to by use of a numeral in parentheses (e.g., phase 5104(1)) while numerals without parentheses refer to any such item (e.g., phases 5104).

FIG. 3 illustrates a side perspective view of one two-winding inductor 300 that can be configured as a two-turn inductor. As discussed below, inductor 300 can advantageously be configured have a lower resistance than inductor 100 (FIG. 1) when used in a two-turn configuration.

Inductor 300 includes single-turn foil staple windings 302, 304 passing through a magnetic core 306 from a first side 308 to an opposite second side 310 of core 306. The fact that windings 302, 304 are single-turn windings promotes both low cost and ease of manufacturing of inductor 300. Core 306 is formed of a magnetic material, such as a ferrite material, and in an embodiment has a rectangular shape. Only the outline of core 306 is shown in FIG. 3 so that windings 302, 304 are visible. FIG. 4 shows a perspective view of windings 302, 304.

One end of winding 302 extends from first side 308 of core 306 and wraps under core 306 to form a solder tab 312 suitable for surface mount soldering to a PCB. Similarly, one end of winding 304 extends from second side 310 of core 306 and wraps under core 306 to form a solder tab 314 suitable for surface mount soldering to a PCB. In contrast to inductor 100, a portion of solder tab 312, approximated by oval 402 (FIG. 4), and a portion of solder tab 314, approximated by oval 404 (FIG. 4), are laterally adjacent to each other under core 306. In some embodiments, a significant portion of a length 406 of solder tab 312 is laterally adjacent to a significant portion of a length 408 of solder tab 314. Such feature may facilitate use of a wide PCB trace connecting solder tabs 312, 314, thereby promoting a low resistance connection between solder tabs 312, 314, as discussed below with respect to FIG. 5. In one embodiment, at least 20% of length 406 of solder tab 312 is laterally adjacent to at least 20% of length 408 of solder tab 314. In an alternate embodiment, at least 40% of length 406 of solder tab 312 is laterally adjacent to at least 40% of length 408 of solder tab 314.

An end of winding 302 extending from second side 310 of core 306 forms a solder tab 316 suitable for surface mount soldering to a PCB, and an end of winding 304 extending from first side 308 of core 306 forms a solder tab 318 suitable for surface mount soldering to a PCB. Although solder tabs 316, 318 are shown as disposed under core 306, one or more of solder tabs 316, 318 could alternately extend away from core 306, such as to form an extended output tongue to provide a low impedance connection to another component.

Figure 2:
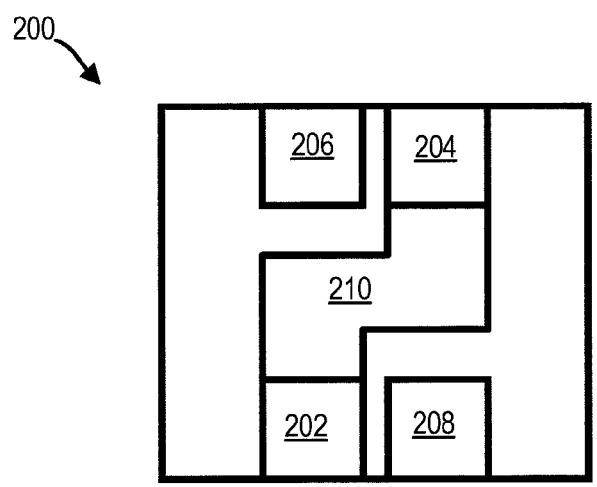
FIG. 2 is a top plan view of one prior art PCB footprint for use with the inductor of FIG. 1.

FIG. 5 is a top plan view of one PCB footprint 500 that can be used to configure inductor 300 as a two-turn inductor when installed on a PCB. Footprint 500 includes pads 502, 504, 506, 508 for respectively connecting to solder tabs 312, 314, 316, 318 of inductor 300. Solder tabs 312, 314 are electrically connected together by a PCB trace 510, when inductor 300 is installed on footprint 500. It should be appreciated that trace 510 is relatively short and wide and therefore provides "fewer squares" of thin, high-resistance PCB foil between tabs 312, 314, thereby providing a low resistance connection between pads 502, 504, and a low resistance connection between windings 302, 304. Accordingly, the fact that portion 402 and portion 404 of solder tabs 312, 314 are laterally adjacent to each other under core 306 allows for a low resistance connection between windings 302, 304, thereby helping to reduce the total resistance of a series combination of windings 302, 304. Thus, although inductor 300 has only single-turn windings, which promote low cost and ease of manufacturing, inductor 300 can advantageously be configured as a relatively low resistance two-turn inductor. In contrast, prior art inductor 100 requires a relatively long, high resistance PCB trace (e.g., trace 210 of FIG. 2) for connecting windings in series, resulting in high resistive power loss, as discussed above.

Figure 6:
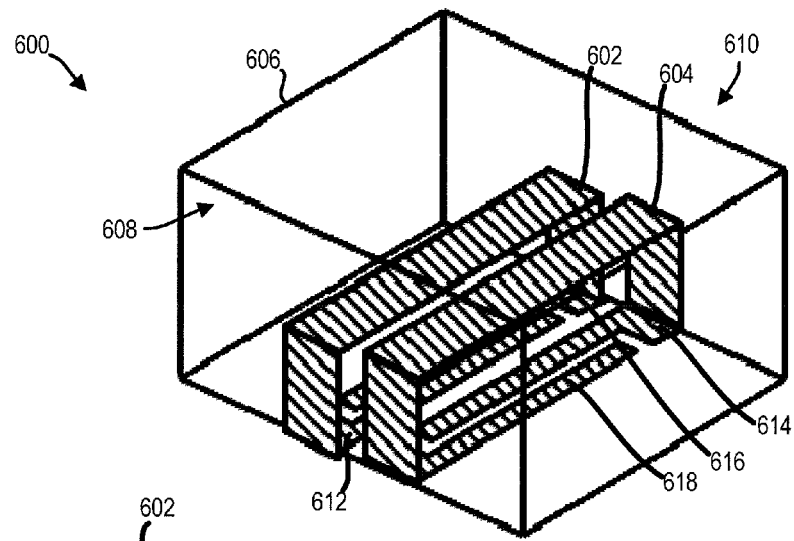
FIG. 6 shows a perspective view of one two-winding inductor configurable as a two-turn inductor, according to an embodiment.
Figure 7:
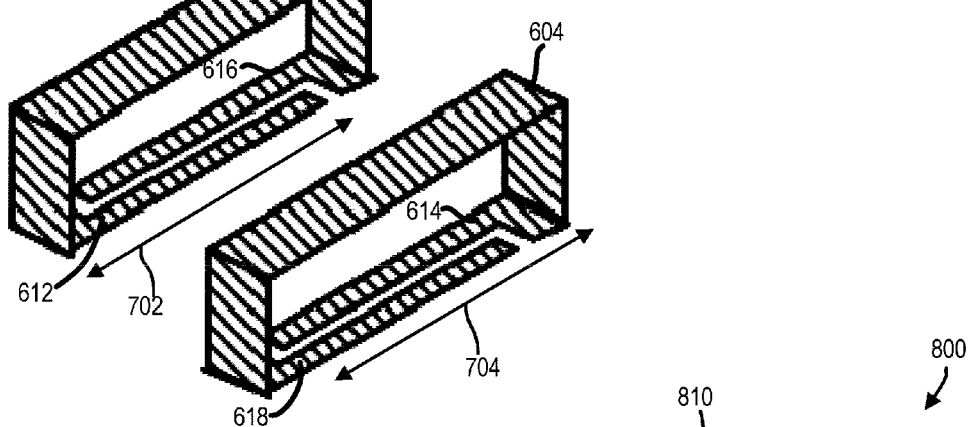
FIG. 7 shows a perspective view of the windings of the inductor of FIG. 6.

FIG. 6 shows a perspective view of another two-winding inductor 600 that can be configured as a two-turn inductor. Inductor 600 is similar to inductor 300 of FIG. 3, but the solder tabs of inductor 600 differs from those of inductor 300. Inductor 600 includes single-turn foil staple windings 602, 604 passing through a magnetic core 606 from a first side 608 to an opposite second side 610 of core 606. Only the outline of core 606 is shown in FIG. 6 so that windings 602, 604 are visible. FIG. 7 shows a perspective view of windings 602, 604.

One end of winding 602 extends from first side 608 of core 606 and wraps under core 606 to form a solder tab 612 suitable for surface mount soldering to a PCB. Similarly, one end of winding 604 extends from second side 610 of core 606 and wraps under core 606 to form a solder tab 614 suitable for surface mount soldering to a PCB. Similar to inductor 300, portions of solder tabs 612, 614 are laterally adjacent to each other under core 606, and in some embodiments, a significant portion of a length 702 of solder tab 612 is laterally adjacent to a significant portion of a length 704 of solder tab 614. In one embodiment, at least 20% of length 702 of solder tab 612 is laterally adjacent to at least 20% of length 704 of solder tab 614. In an alternate embodiment, at least 40% of length 702 of solder tab 612 is laterally adjacent to at least 40% of length 704 of solder tab 614. An end of winding 602 extending from second side 610 of core 606 forms a solder tab 616 suitable for surface mount soldering to a PCB, and an end of winding 604 extending from first side 608 of core 606 forms a solder tab 618 suitable for surface mount soldering to a PCB. A portion of solder tab 616 is laterally adjacent to a portion of solder tab 612 under core 606, and a portion of solder tab 618 is laterally adjacent a portion of solder tab 614 under core 606.

Figure 8:
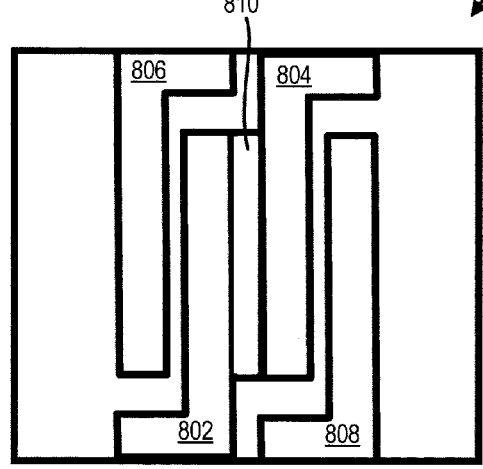
FIG. 8 is a top plan view of one PCB footprint for use with the inductor of FIG. 6, according to an embodiment.

FIG. 8 is a top plan view of one PCB footprint 800 that can be used to configure inductor 600 as a two-turn inductor when installed on a PCB. Footprint 800 includes pads 802, 804, 806, 808 for respectively connecting to solder tabs 612, 614, 616, and 618 of inductor 600. Pads 802, 804 are electrically connected together by a PCB trace 810. Similar to PCB trace 510 of footprint 500 (FIG. 5), PCB trace 810 is relatively short and wide therefore provides low resistance connection between pads 802, 804. Additionally, solder pads 806, 808 are relatively long, such as compared to pads 206, 208 of FIG. 2, thereby enabling low resistance connections between windings 602, 604 and pads 806, 808. Accordingly, the configuration of inductor 600 not only promotes a low resistance series connection between windings when used in a two-turn configuration, but also promotes a low resistance connection between end terminals of the series connected windings and a PCB.

Figure 9:
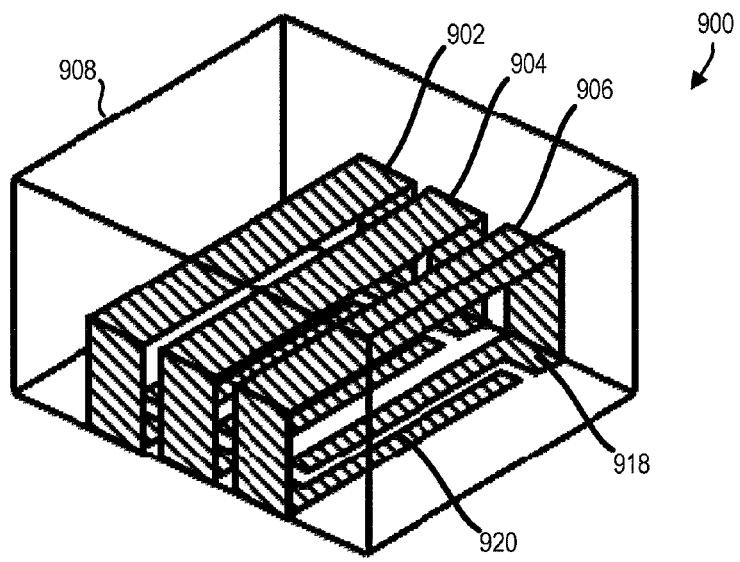
FIG. 9 shows a perspective view of one three-winding inductor configurable as a three-turn inductor, according to an embodiment.
Figure 10:
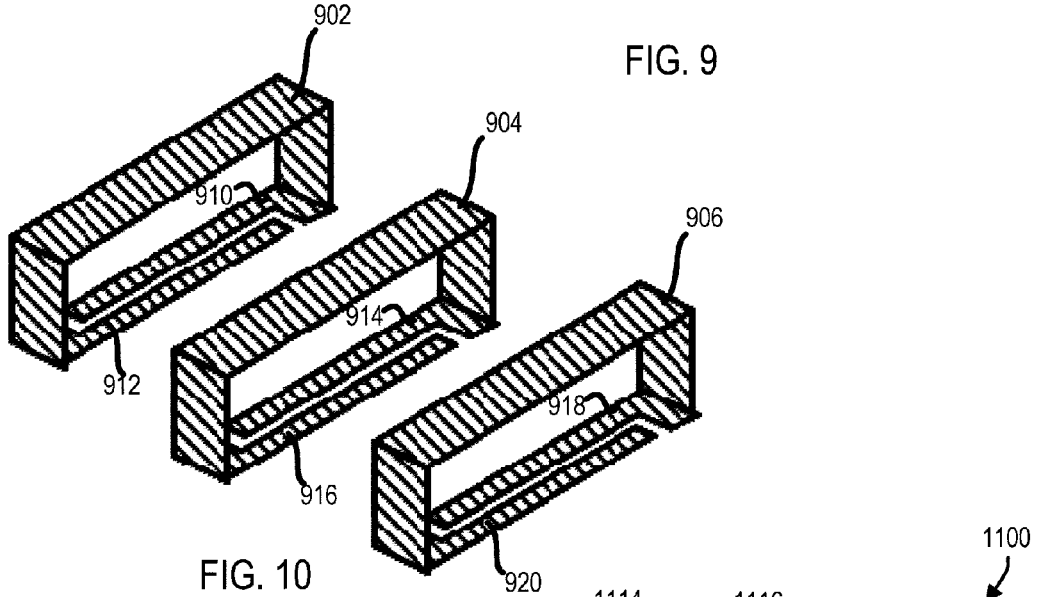
FIG. 10 shows a perspective view of the windings of the inductor of FIG. 9.

Inductors 300 or 600 could be adapted to have three or more windings so that the inductors are configurable as three or more turn inductors. For example, FIG. 9 is a perspective view of one inductor 900, which is similar to inductor 600, but includes three single-turn foil staple windings 902, 904, 906 and a core 908. Only the outline of core 908 is shown in FIG. 9 so that windings 902, 904, 906 are visible. FIG. 10 is a perspective view of windings 902, 904, 906. Winding 902 forms solder tabs 910, 912 under core 908; winding 904 forms solder tabs 914, 916 under core 908; and winding 906 forms solder tabs 918, 920 under core 908. Portions of solder tabs 912 and 914 are laterally adjacent under core 908, thereby enabling a low resistance series connection between windings 902, 904, and portions of solder tabs 916 and 918 are laterally adjacent under core 908, thereby enabling a low resistance series connection between windings 904, 906. In some embodiments, a significant portion of a length of solder tab 912 is laterally adjacent to a significant portion of a length of solder tab 914, and a significant portion of a length of solder tab 916 is laterally adjacent to a significant portion of a length of solder tab 918. Lengths of solder tabs 912 and 916 are analogous to length 702 of solder tab 612 (FIG. 7), and lengths of solder tabs 914, 918 are analogous to length 704 of solder tab 614 (FIG. 7). In one embodiment, at least 20% of the length of solder tab 912 is laterally adjacent to at least 20% of the length of solder tab 914, and at least 20% of the length of solder tab 916 is laterally adjacent to at least 20% of the length of solder tab 918. In an alternate embodiment, at least 40% of the length of solder tab 912 is laterally adjacent to at least 40% of the length of solder tab 914, and at least 40% of the length of solder tab 916 is laterally adjacent to at least 40% of the length of solder tab 918. The relatively long length of solder tabs 910, 912, 914, 916, 918, 920 also advantageously enables a low resistance connection to a PCB.

Figure 11:
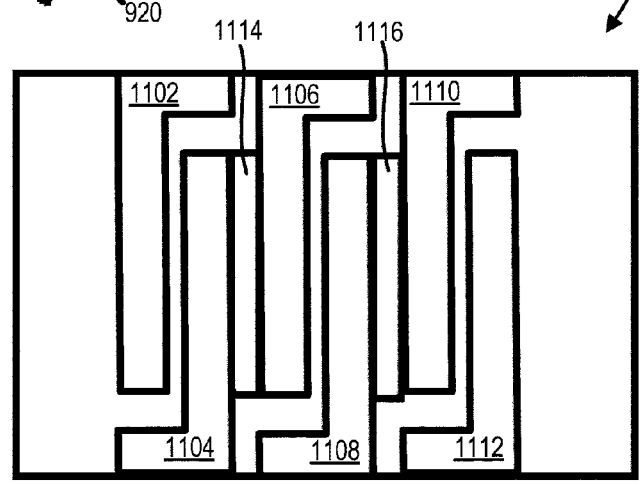
FIG. 11 is a top plan view of one PCB footprint for use with the inductor of FIG. 9, according to an embodiment.

FIG. 11 shows one PCB footprint 1100 that can be used to configure inductor 900 as a three-turn inductor when installed on a PCB. Footprint 1100 includes solder pads 1102, 1104, 1106, 1108, 1110, and 1112. A PCB trace 1114 connects pads 1004, 1006, thereby providing a connection between windings 902 and 904. Similarly, a PCB trace 1116 connects pads 1108, 1010, thereby providing a connection between windings 904, 906. Because solder tabs 912, 914 are laterally adjacent under core 908, solder tabs 916, 918 are laterally adjacent under core 908, and solder tabs 912, 914, 916, and 918, are long, PCB traces 1114 and 1116 are relatively short and wide, thereby respectively providing low resistance connections between windings 902, 904, and between windings 904, 906. Accordingly, the configuration of inductor 900 advantageously allows for a low resistance series connection of windings 902, 904, 906. Thus, although inductor 900 has single-turn windings, which promote low cost and ease of manufacturing, inductor 900 can advantageously be configured as a relatively low resistance three-turn inductor.

Figure 12:
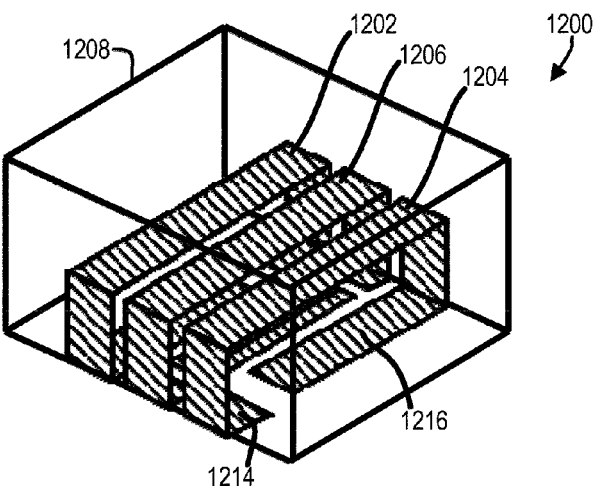
FIG. 12 shows a perspective view of another three-winding inductor configurable as a three-turn inductor, according to an embodiment.
Figure 13:
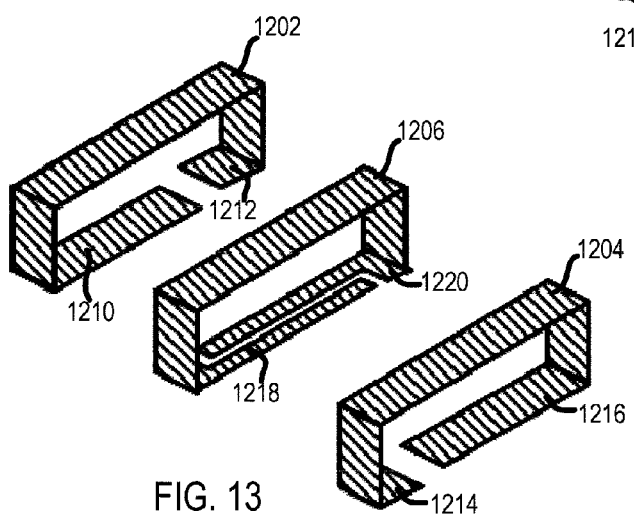
FIG. 13 shows a perspective view of the windings of the inductor of FIG. 12.

Inductors 300 or 600 could be modified such that two or more single turn windings of the inductor have different configurations. For example, FIG. 12 shows a perspective view of one inductor 1200, which can be configured as a three-turn inductor. Inductor 1200 includes windings 1202, 1204, which are similar to windings 302, 304 of inductor 300, winding 1206, which is similar to windings 602, 604 of inductor 600, and a magnetic core 1208. Only the outline of core 1208 is shown in FIG. 12 so that windings 1202, 1204, 1206 are visible. FIG. 13 shows a perspective view of windings 1202, 1204, 1206. Winding 1202 forms solder tabs 1210, 1212 under core 1208; winding 1204 forms solder tabs 1214, 1216 under core 1208; and winding 1206 forms solder tabs 1218, 1220 under core 1208. Portions of solder tabs 1210 and 1220 are laterally adjacent under core 1208, thereby enabling a low resistance series connection between windings 1202, 1206, and portions of solder tabs 1216 and 1218 are laterally adjacent under core 1208, thereby enabling a low resistance series connection between windings 1204, 1206. In some embodiments, a significant portion of a length of solder tab 1210 is laterally adjacent to a significant portion of a length of solder tab 1220, and a significant portion of a length of solder tab 1216 is laterally adjacent to a significant portion of a length of solder tab 1218. The length of solder tab 1210 is analogous to length 406 of solder tab 312 (FIG. 4), the length of solder tab 1216 is analogous to length 408 of solder tab 314 (FIG. 4), the length of solder tab 1218 is analogous to length 702 of solder tab 612 (FIG. 7), and the length of solder tab 1220 is analogous to length 704 of solder tab 614 (FIG. 7). In one embodiment, at least 20% of the length of solder tab 1210 is laterally adjacent to at least 20% of the length of solder tab 1220, and at least 20% of the length of solder tab 1216 is laterally adjacent to at least 20% of the length of solder tab 1218. In an alternate embodiment, at least 40% of the length of solder tab 1210 is laterally adjacent to at least 40% of the length of solder tab 1220, and at least 40% of the length of solder tab 1216 is laterally adjacent to at least 40% of the length of solder tab 1218.

Figure 14:
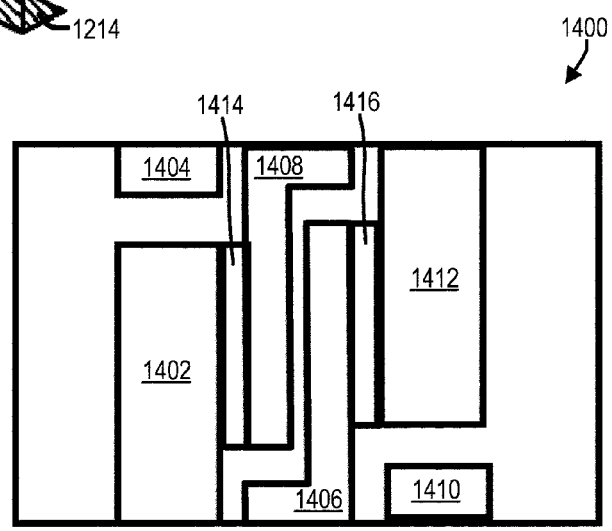
FIG. 14 is a top plan view of one PCB footprint for use with the inductor of FIG. 12, according to an embodiment.

FIG. 14 shows one PCB footprint 1400 that can be used to configure inductor 1200 as a three-turn inductor when installed on a PCB. Footprint 1400 includes solder pads 1402, 1404, 1406, 1408, 1410, and 1412. A PCB trace 1414 connects pads 1402, 1408, and a PCB trace 1416 connects pads 1406, 1412. Due to portions of solder tabs 1210, 1220 being adjacent under core 1208, portions solder tabs 1216, 1218 being adjacent under core 1208, and the relatively long length of solder tabs 1210, 1216, 1218 and 1220, PCB traces 1414 and 1416 are relatively short and wide, thereby respectively providing low resistance connections between pads 1402, 1408 and between pads 1406, 1412. Accordingly, the configuration of inductor 1400 advantageously allows for a low resistance series connection of windings 1202, 1204, 1206. Thus, although inductor 1200 has single-turn c-shaped staple windings which promote low cost and ease of manufacturing, inductor 1200 can advantageously be configured as a relatively low resistance three-turn inductor.

Figure 15:
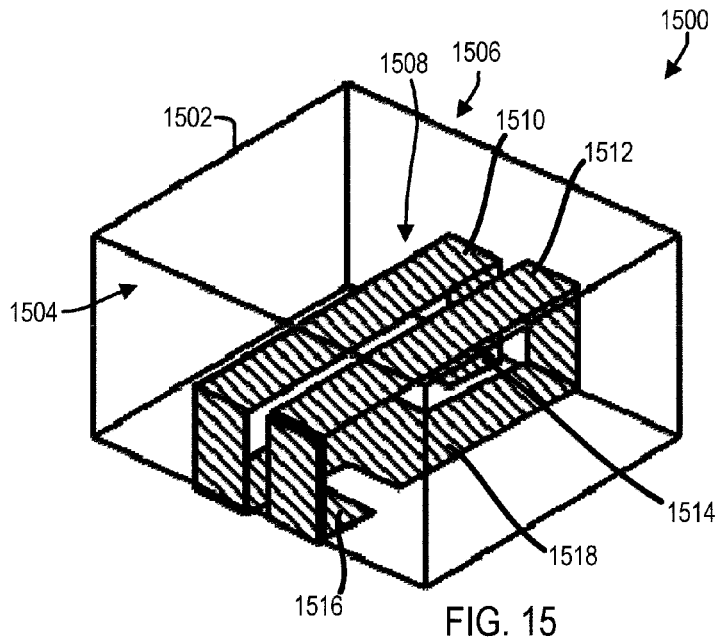
FIG. 15 shows a perspective view of one two-turn inductor, according to an embodiment.
Figure 16:
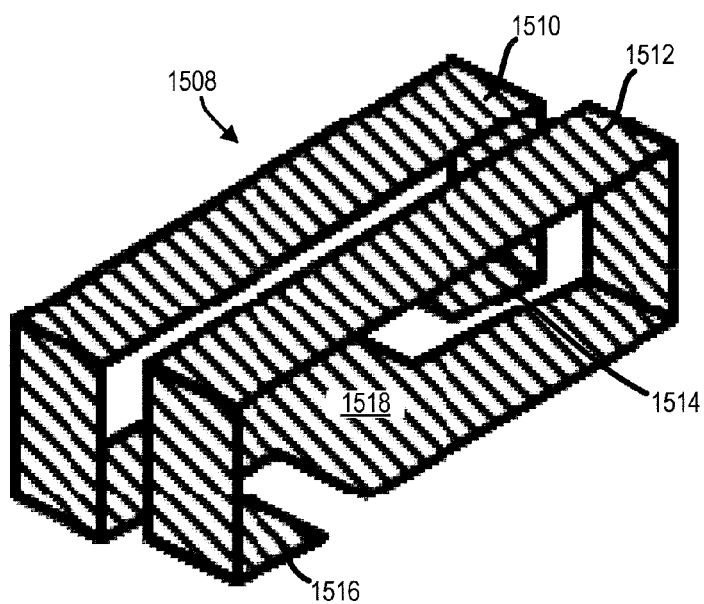
FIG. 16 shows a perspective view of a two-turn winding of the inductor of FIG. 15.

FIG. 15 shows a perspective view of one two-turn inductor 1500. Inductor 1500 includes a magnetic core 1502 having a first side 1504 opposite a second side 1506 and a two-turn winding 1508. Only the outline of core 1502 is shown in FIG. 15 to more clearly showing winding 1508. FIG. 16 shows a perspective view of winding 1508. Although winding 1508 is shown as being a two-turn winding, winding 1508 could have additional turns so that inductor 1500 may be a three or more turn inductor.

Winding 1508 includes a first foil portion 1510 and a second foil portion 1512 each passing through core 1502 from first side 1504 to second side 1506. An end of first foil portion 1510 extends from second side 1506 to form a solder tab 1514 for surface mount soldering to a PCB. Similarly, an end of second foil portion 1512 extends from first side 1504 of core 1502 to form a solder tab 1516 for surface mount soldering to a PCB. Although solder tabs 1514, 1516 are shown as being disposed under core 1502, one or both of the solder tabs may extend away from core 1502, such as to form an extended tongue to provide a low impedance connection to another component.

Winding 1508 further includes a foil interconnect 1518 wrapping under core 1502 and electrically coupling to an end of first portion 1510 extending from first side 1504 to an end of second portion 1512 extending from second side 1506. Foil interconnect 1518 is typically 10 to 30 times thicker than a PCB trace, and foil interconnect 1518 thereby typically provides a much lower resistance connection between winding turns than inductors where winding turns are connected by PCB traces (e.g., inductor 100 of FIG. 1).

Figure 17:
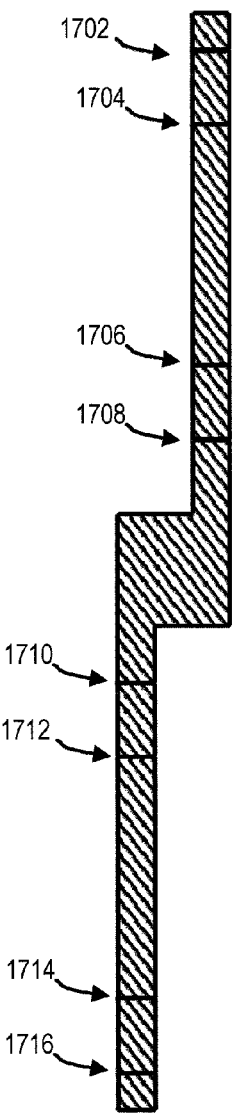
FIG. 17 is a top plan view of the two-turn winding of the inductor of FIG. 15 when the winding is flattened.

FIG. 17 is a top plan view of winding 1508 when flattened, such as after being stamped but before being shaped for used with inductor 1500. Winding 1508 has a relatively simple configuration that may allow for an embodiment to be formed into its final three dimensional shape while being wound around a portion of core 1502. Lines 1702, 1704, 1706, 1708, 1710, 1712, 1714, 1716 show where winding 1508 would be bent when wound around the core portion. The ability to simultaneously shape and wind an embodiment of winding 1508 around a core portion promotes economical manufacturing of inductor 1500. In contrast, prior-art multi-turn inductors typically include relatively complex windings that must be formed into their final three dimensional shapes prior to attachment to a core, thereby requiring an extra manufacturing step that may increase manufacturing costs.

Inductor 1500 may also be modified for use as a "drop-in" inductor for installation in a PCB aperture. Drop-in inductors may be particularly useful in height constrained applications because they can be configured to use height available on both sides of a PCB as well as height associated with the PCB's thickness.

Figure 18:
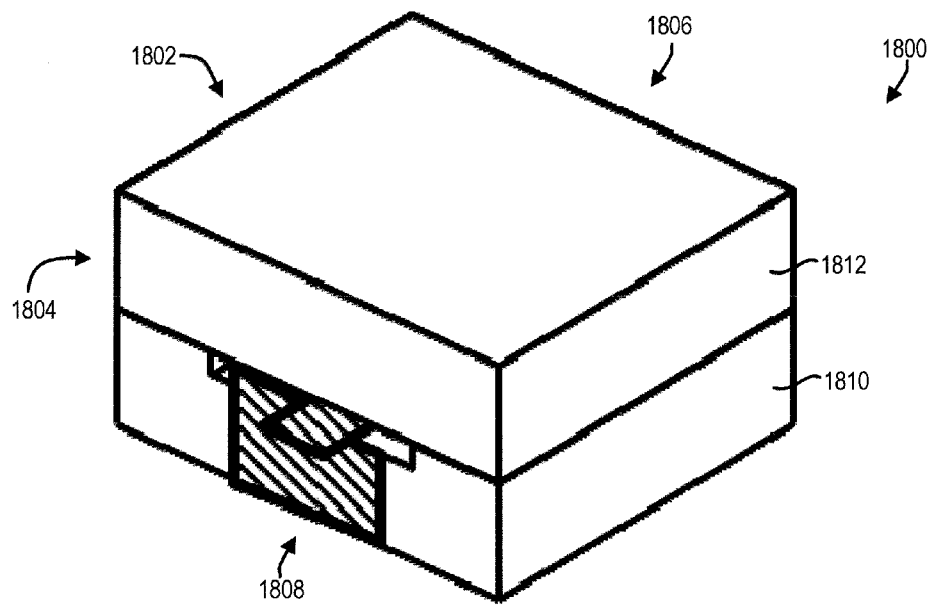
FIG. 18 shows a perspective view of one two-turn drop-in inductor, according to an embodiment.
Figure 19:
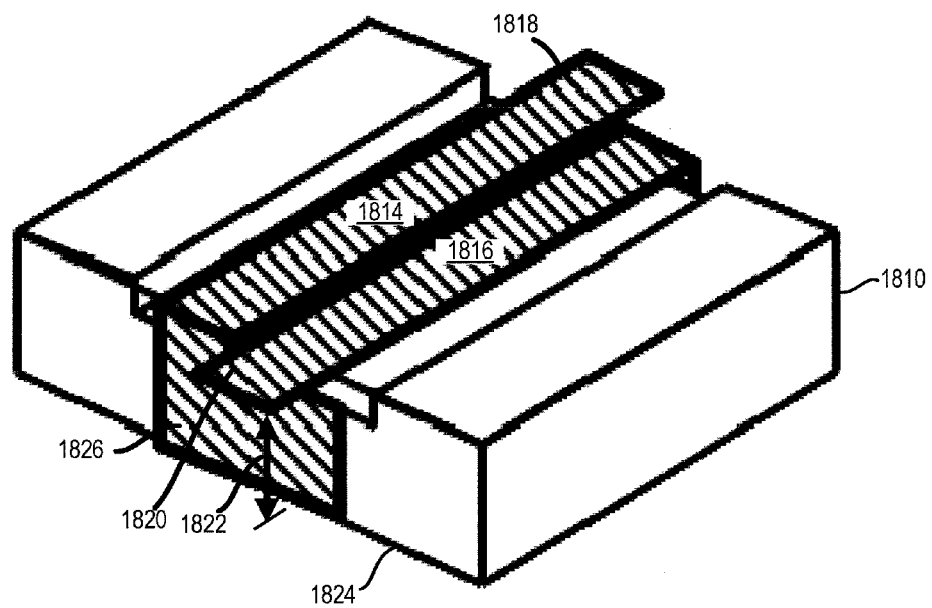
FIG. 19 shows a perspective view of the inductor of FIG. 18 with a top magnetic element removed.

FIG. 18 shows a perspective view of inductor 1800, which is an example of inductor 1500 modified for drop-in use. Inductor 1800 includes a magnetic core 1802 having a first side 1804 and an opposite second side 1806 and a two-turn winding 1808. Although winding 1808 is shown as being a two-turn winding, winding 1808 may have additional turns. Core 1802 includes, for example, magnetic elements 1810, 1812 as shown. FIG. 19 shows inductor 1800 with magnetic element 1812 removed, and FIG. 20 shows an exploded perspective view of inductor 1800.

Winding 1808 includes a first foil portion 1814 and a second foil portion 1816, each passing through core 1802 from first side 1804 to second side 1806. An end of first foil portion 1814 extends from second side 1806 to form a solder tab 1818 suitable for surface mount soldering to a PCB. Similarly, an end of second foil portion 1816 extends from first side 1804 of core 1802 to form a solder tab 1820 suitable for surface mount soldering to a PCB. Solder tabs 1818, 1820 are disposed at a common height 1822 from a bottom surface 1824 of core 1802, where height 1822, for example, is displaced from bottom surface 1824. Although solder tabs 1818, 1820 are shown as being coplanar with first and second foil portions 1814, 1816, solder tabs 1818, 1820 may be displaced from first and second foil portions 1814, 1816, such as to change the vertical position of inductor 1800 with respect to a PCB.

Similar to winding 1508 of inductor 1500 (FIG. 15), winding 1808 further includes a foil interconnect 1826 wrapping under core 1802 and electrically coupling to an end of first foil portion 1814 extending from first side 1804 to an end of second foil portion 1816 extending from second side 1806. Foil interconnect 1826 is typically 10 to 30 times thicker than a PCB trace, and foil interconnect 1826 thereby typically provides a much lower resistance connection between winding turns than inductors where winding turns are connected by PCB traces (e.g., inductor 100 of FIG. 1).

FIG. 21 is a top plan view of printed circuit assembly ("PCA") 2100, which is one example of an application of inductor 1800. PCA 2100 includes inductor 1800 installed in an aperture 2102 of a PCB 2104. In PCA 2100, inductor 1800 serves as a buck inductor of a buck converter. Accordingly, solder tab 1820 electrically couples to a switching node Vx, and solder tab 1818 electrically couples to an output node Vo. The current flows through inductor 1800 in the direction of the arrows of FIG. 21. FIG. 22 shows a cross sectional view of PCA 2100, including a cross-section of inductor 1800 installed on PCB 2104.

The inductors discussed above may also be modified to include one or more ground return conductors to improve ground return conductivity in the inductor's vicinity. The ground return conductors, for example, are configured and arranged such that inductance attributable to the ground return conductors in a circuit including the ground return conductors is not significantly increased by presence of the inductor's core, relative to an otherwise identical inductor without the core. In contrast, in such example, inductance attributable to the inductor's winding (or windings) in a circuit including the winding(s) is significantly increased by presence of the inductor's core, relative to an otherwise identical inductor without the core. As an example, the ground return conductors may be configured and arranged such that the inductor's core does not form a magnetic path loop around the ground return conductors. In such embodiments, the ground return conductors are external to core, and the ground return conductors may provide an inductance contribution to a loop that is similar to an inductance contribution of a PCB ground plane extending under a standard surface mount inductor (without ground return conductors), where the ground plane is in close proximity to the standard surface mount inductor's core.

In many applications, current flows from switching devices through the inductor and to a load. Return current typically flows from the load, through PCB conductive layers under the inductor, and back to the switching devices. Accordingly, use of an inductor including ground return conductors may reduce ground return path impedance while maintaining the PCB's general current flow path.

Additionally, attaching a ground return conductor to an inductor allows both the inductor and the ground return conductor to be placed in a single step, thereby eliminating multiple placement operations required for placement of a discrete inductor and a discrete conductor. Furthermore, applying a foil conductor to a PCB may be difficult due to the foil's flexibility, but attaching a foil ground return conductor to an inductor increases the conductor's rigidity and may thereby facilitate the conductor's placement on a PCB Furthermore, ground return conductors may act as heat sinks to cool components in their vicinity. For example, a buck converter typically has power semiconductors electrically connected to a ground return node, and a ground return conductor connected to such node may conduct heat away from the power semiconductors and transfer the heat to the environment.

Figure 23:
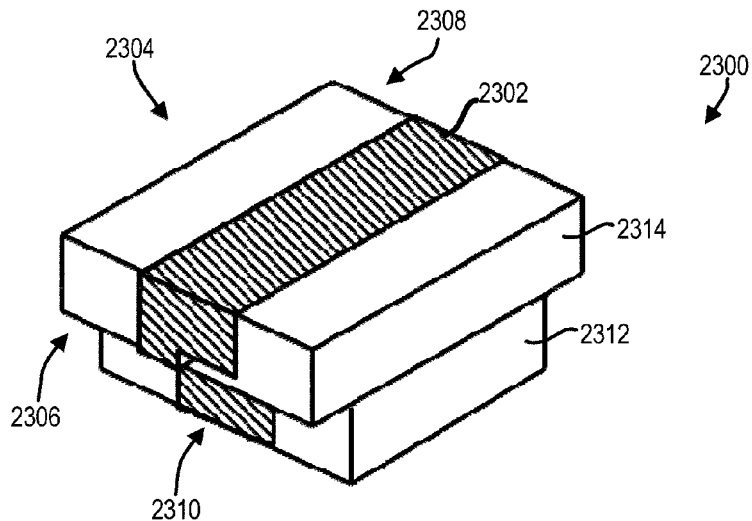
FIG. 23 shows a perspective view of one two-turn drop-in inductor including a ground return conductor, according to an embodiment.
Figure 24:
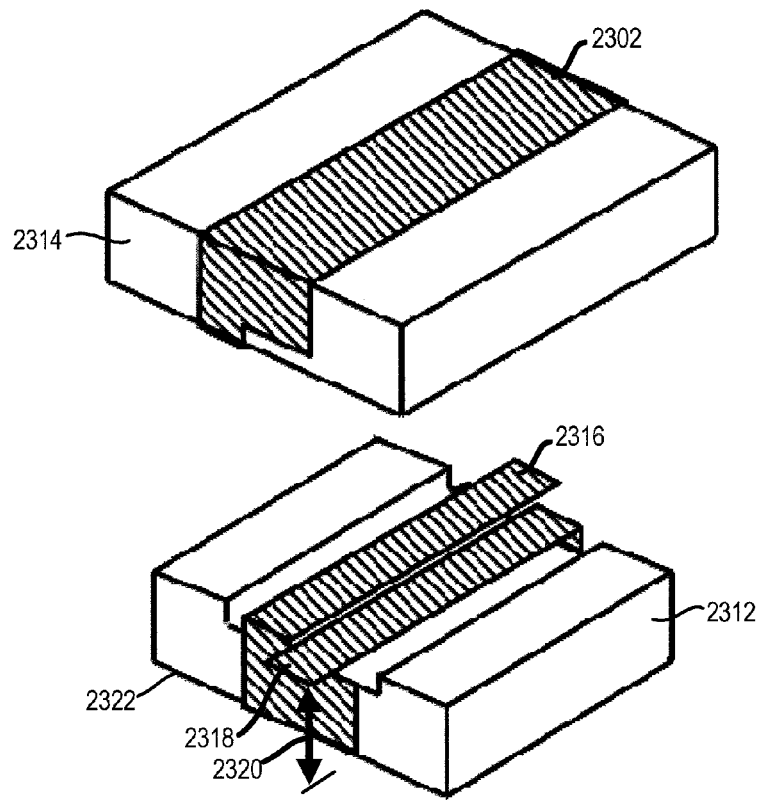
FIG. 24 shows a perspective view of the inductor of FIG. 23 with magnetic elements separated.
Figure 25:
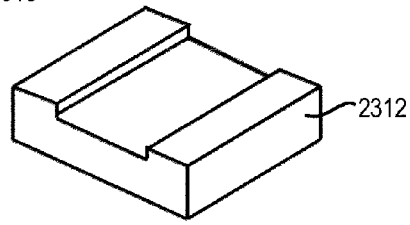
FIG. 25 shows an exploded perspective view of the inductor of FIG. 23.

Ground return conductors may be particular useful in drop-in inductor applications, where a PCB aperture takes away PCB surface area that could be used to conduct return current. FIG. 23 shows a perspective view of one inductor 2300, which is a drop-in inductor similar to inductor 1800 (FIG. 18) including a ground return conductor 2302. Inductor 2300 additionally includes a core 2304 having a first side 2306 and an opposite second side 2308 and a two-turn winding 2310. Core 2304 includes magnetic elements 2312, 2314. Winding 2310 is affixed to magnetic element 2312, and ground return conductor 2302 is affixed to magnetic element 2314. Core 2304 does not form a magnetic path loop around ground return conductor 2302. FIG. 24 shows a perspective view of inductor 2300 with magnetic elements 2312, 2314 separated, and FIG. 25 shows an exploded perspective view of inductor 2300. Although winding 2310 is shown as being a two-turn winding, winding 2310 could form additional turns.

Similar to winding 1808 of inductor 1800 (FIG. 18), winding 2310 forms two solder tabs 2316, 2318 disposed at a common height 2320 relative to a bottom surface 2322 of core 2304. Height 2320, for example, is displaced from bottom surface 2322. Ground return conductor 2302 also forms solder tabs 2324, 2326 disposed at height 2320, such that each of solder tabs 2316, 2318, 2324, 2326 may be surface mount soldered to a common PCB. Magnetic element 2314 helps press the solder tabs 2316, 2318, 2324, 2326 to a PCB, thereby advantageously improving planarity of the solder tabs and improving mechanical robustness of a PCA including inductor 2300.

Figure 26:
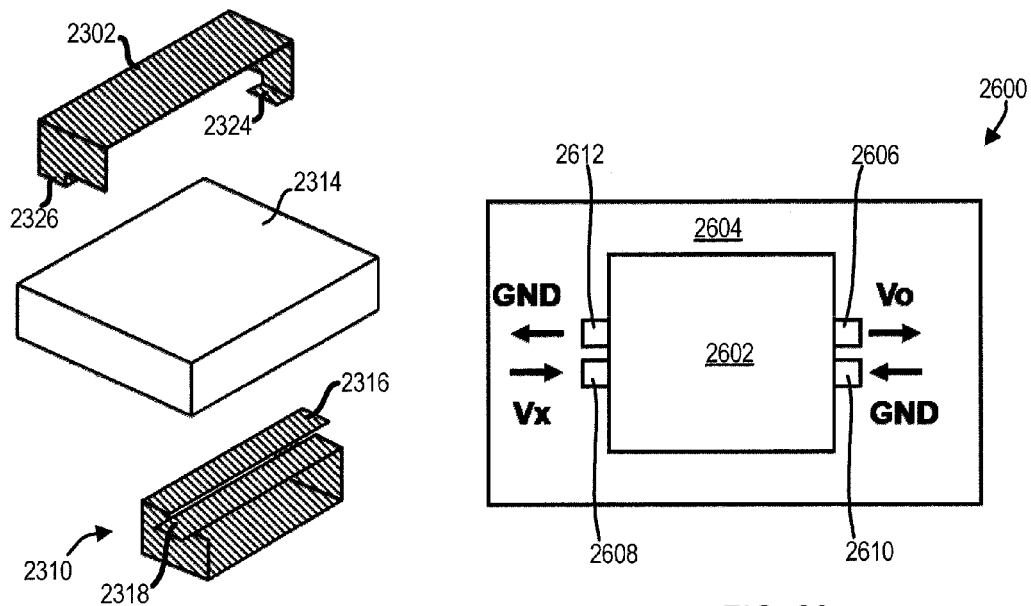
FIG. 26 shows a top plan view of one PCB footprint for use with the inductor of FIG. 23, according to an embodiment.
Figure 27:
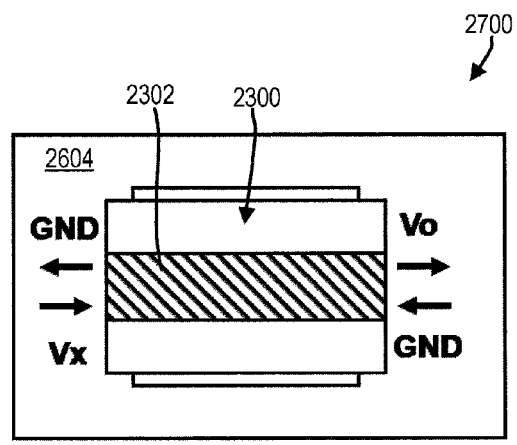
FIG. 27 is a top plan view of one printed circuit assembly including the inductor of FIG. 23, according to an embodiment.
Figure 28:
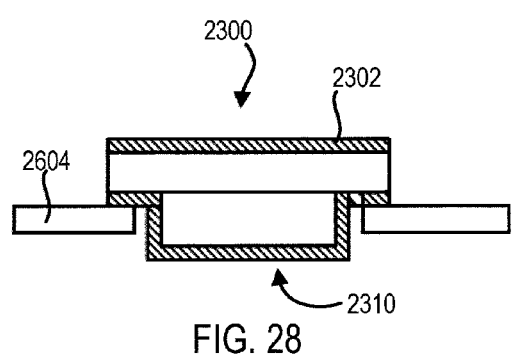
FIG. 28 shows a cross-sectional view of the printed circuit assembly of FIG. 27.

FIG. 26 is a top plan view of one PCB footprint 2600, which is one example of a PCB footprint for use with inductor 2300. Footprint 2600, which is used in a buck converter application, includes an aperture 2602 formed in a PCB 2604. Pads 2606, 2608, 2610, 2612 respectively connect to solder tabs 2316, 2318, 2324, and 2326 of inductor 2300. Pad 2608 connects to a buck converter switching node, pad 2606 connects to an output node, and pads 2610, 2612 are part of a ground current node. Right pointing arrows indicate DC current flow from the switching node through winding 2310 to the load, and left pointing arrows indicate DC ground current flow through ground return conductor 2302. Thus, ground return conductor 2302 provides a path for ground current to traverse aperture 2602. FIG. 27 is a top plan view of a PCA 2700, which includes inductor 2300 installed on PCB footprint 2600. FIG. 28 is a cross sectional view of PCA 2700, including a cross-sectional view of inductor 2300 and PCB 2604.

Figure 29:
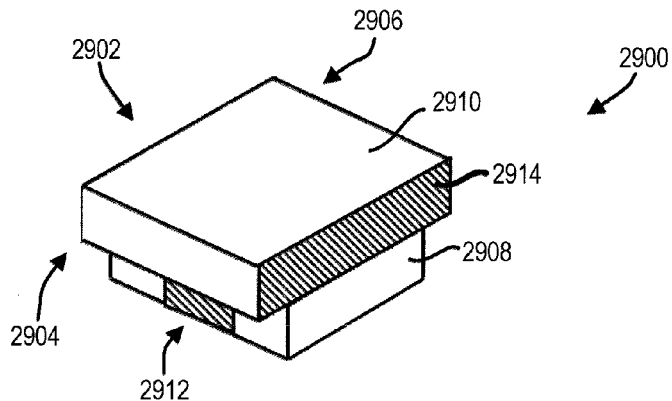
FIG. 29 shows a perspective view of one two-turn drop-in inductor including two ground return conductors, according to an embodiment.
Figure 30:
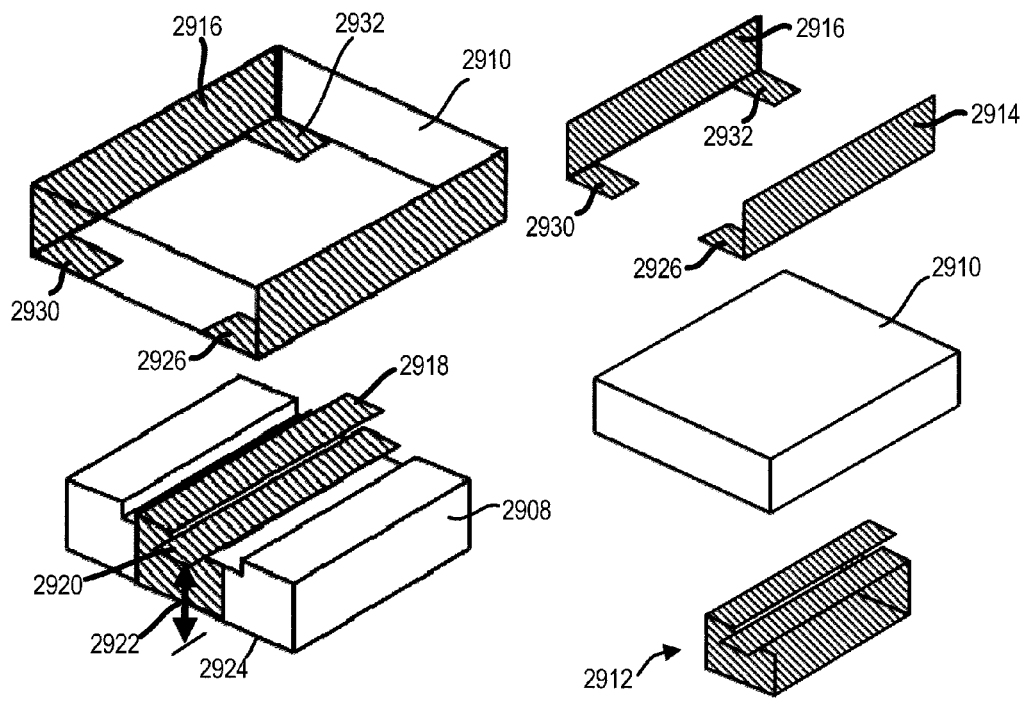
FIG. 30 shows a perspective view of the inductor of FIG. 29 with magnetic elements separated.
Figure 31:
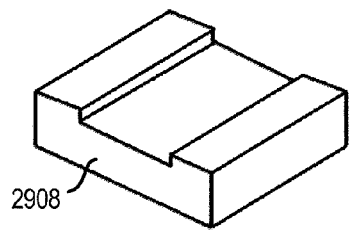
FIG. 31 shows an exploded perspective view of the inductor of FIG. 29.

FIG. 29 shows a perspective view of one drop-in inductor 2900, which is similar to inductor 2300 (FIG. 23) but has two ground return conductors. Inductor 2900 includes a magnetic core 2902 having a first side 2904 opposite a second side 2906. Core 2902 includes magnetic elements 2908, 2910. A two-turn winding 2912 is affixed to magnetic element 2908, and ground return conductors 2914, 2916 are affixed to magnetic element 2910. Core 2902 does not form a magnetic path loop around ground return conductors 2914, 2916. FIG. 30 shows a perspective view of inductor 2900 with magnetic elements 2908, 2910 separated and magnetic element 2910 being transparent. FIG. 31 shows an exploded perspective view of inductor 2900. Although winding 2912 is shown as being a two-turn winding, winding 2912 can form additional turns.

Similar to winding 1808 of inductor 1800 (FIG. 18), winding 2912 forms solder tabs 2918, 2920 disposed a common height 2922 relative to a bottom surface 2924 of core 2902. Height 2922, for example, is displaced from bottom surface 2924. Ground return conductor 2914 forms solder tab 2926 and another solder tab (not visible in the perspective views) at an opposite end of conductor 2914. Ground return conductor 2916 forms solder tabs 2930, 2932. Each of solder tabs 2918, 2920, 2926, 2930, 2932 are disposed at height 2922 suitable for surface mount connection to a common PCB. Similar to inductor 2300, magnetic element 2910 helps press the solder tabs 2918, 2920, 2926, 2930, 2932 to a PCB, thereby advantageously improving planarity of the solder tabs and improving mechanical robustness of a PCA including inductor 2900.

Figure 32:
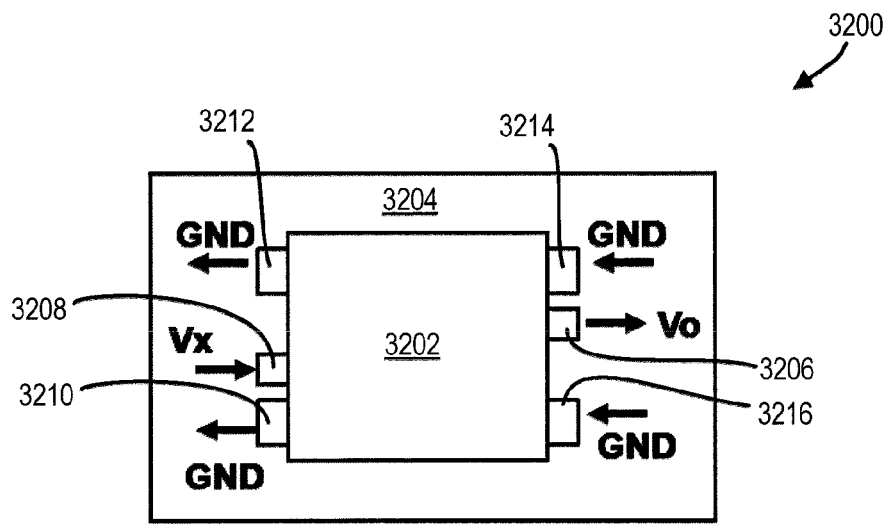
FIG. 32 is a top plan view of one PCB footprint for use with the inductor of FIG. 29, according to an embodiment.
Figure 33:
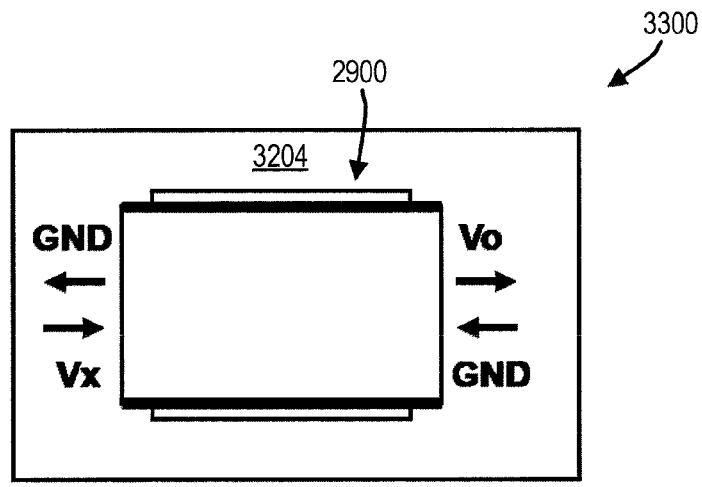
FIG. 33 is a top plan view of one printed circuit assembly including the inductor of FIG. 29, according to an embodiment.
Figure 34:
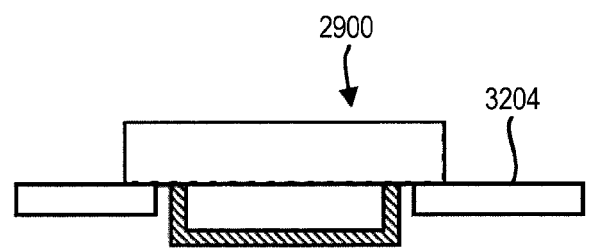
FIG. 34 is a cross-sectional view of the printed circuit assembly of FIG. 33.

FIG. 32 is a top plan view of one PCB footprint 3200, which is one example of a PCB footprint for use with inductor 2900. Footprint 3200, which is used in a buck converter application, includes an aperture 3202 formed in a PCB 3204. Pads 3206, 3208, 3210, 3212, 3214 respectively connect to solder tabs 2918, 2920, 2926, 2930, 2932 of inductor 2900. Pad 3216 connects to the other solder tab of ground return conductor 2914 not visible in the perspective views. Pad 3208 connects to the buck converter switching node, pad 3206 connects to an output node, and pads 3210, 3212, 3214, 3216 are part of a ground current node. Right pointing arrows indicate DC current flow from the switching node through winding 2912 to the load, and left pointing arrows indicate DC ground current flow through ground return conductors 2914, 2916. Thus, ground return conductors 2914, 2916 provide a path for ground current to traverse aperture 3202. FIG. 33 is a top plan view of a PCA 3300, which includes inductor 2900 installed on PCB footprint 3200. FIG. 34 is a cross sectional view of PCA 3400, including a cross-sectional view of inductor 2900 and PCB 3204.

Figure 35:
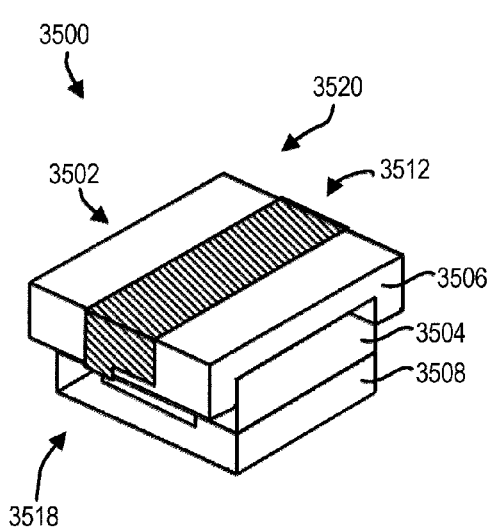
FIG. 35 shows a perspective view of another two-turn drop-in inductor including a ground return conductor, according to an embodiment.
Figure 36:
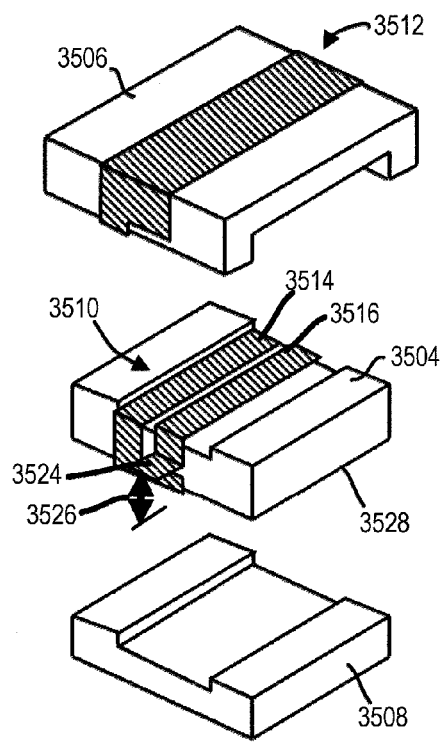
FIG. 36 shows a perspective view of the inductor of FIG. 35 with magnetic elements separated.
Figure 37:
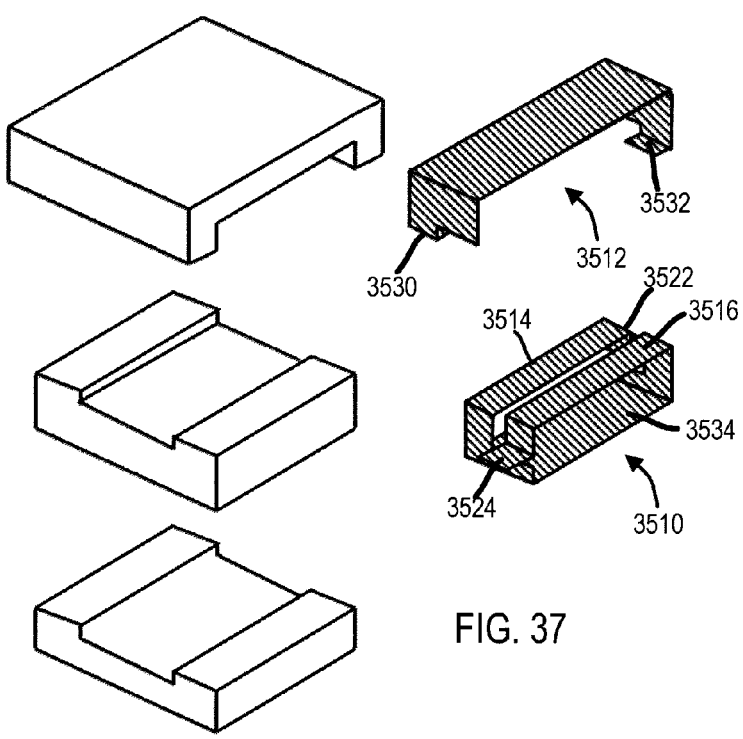
FIG. 37 is an exploded perspective view of the inductor of FIG. 35.

FIG. 35 shows a perspective view of inductor 3500, which is an example of another drop-in inductor including a ground return conductor. Inductor 3500 includes a magnetic core 3502 including magnetic elements 3504, 3506. Another magnetic element 3508 is also coupled to magnetic element 3504. FIG. 36 shows inductor 3500 with magnetic elements 3504, 3506, 3508 separated, and FIG. 37 is an exploded perspective view of inductor 3500. FIG. 38 shows a cross sectional view of inductor 3500 installed in an aperture of a PCB 3802.

Inductor 3500 further includes a two-turn winding 3510 affixed to magnetic element 3504 and a ground return conductor 3512 affixed to magnetic element 3506. Core 3502 does not form a magnetic path around ground return conductor 3512. Winding 3510 is advantageously shielded by magnetic elements 3506 and 3508. Winding 3510 includes a first foil portion 3514 and a second foil portion 3516 each passing through core 3502 from a first side 3518 to an opposite second side 3520. An end of first foil portion 3514 extends from second side 3520 to form a solder tab 3522 suitable for surface mount soldering to a PCB. Similarly, an end of second foil portion 3516 extends from first side 3518 of core 3502 to form a solder tab 3524 suitable for surface mount soldering to a PCB. Solder tabs 3522 and 3524 are disposed at a common height 3526 relative to a bottom surface 3528 of core 3502. Height 3526 is, for example, displaced from bottom surface 3528. Solder tabs 3522 and 3524 are displaced from first and second foil portions 3514, 3516. Ground return conductor 3512 also forms solder tabs 3530, 3532 at height 3526 such that each of solder tabs 3522, 3524, 3530, 3532 may be surface mount soldered to a common PCB.

Winding 3510 further includes a foil interconnect 3534 wrapping under core 3502 and electrically coupling to an end of first portion 3514 extending from first side 3518 to an end of second portion 3516 extending from second side 3520. Foil interconnect 3534 is typically 10 to 30 times thicker than a PCB trace, and foil interconnect 3534 thereby typically provides a much lower resistance connection between winding turns than inductors where winding turns are connected by PCB traces (e.g., inductor 100 of FIG. 1).

The inductors described above may be modified for use in multiphase converters, where two or more windings are magnetically coupled together. For example, FIG. 39 shows a perspective view of one inductor 3900, which is similar to inductor 300 (FIG. 3), but includes four windings 3902, 3904, 3906, 3908. Inductor 3900 may be configured as a two-winding inductor where each winding has two turns by electrically connecting together windings 3902, 3904 and by electrically connecting together windings 3906, 3908. Inductor 3900 further includes a magnetic core 3910 magnetically coupling together windings 3902, 3904, 3906, 3908. Accordingly, when winding 3902, 3904 are electrically connected in series and windings 3906, 3908 are electrically connected in series, core 3910 magnetically couples together such two pairs of series connected windings. Only the outline of core 3910 is shown in FIG. 39 to show windings 3902, 3904, 3906, 3908. FIG. 40 shows a perspective view of windings 3902, 3904, 3906, 3908. Winding 3902 forms solder tabs 3912, 3914 suitable for surface mount soldering to a PCB; winding 3904 forms solder tabs 3916, 3918 suitable for surface mount soldering to a PCB; winding 3906 forms solder tabs 3920, 3922 suitable for surface mount soldering to a PCB; and winding 3908 forms solder tabs 3924, 3926 suitable for surface mount soldering to a PCB. A portion of solder tab 3914 is laterally adjacent to a portion of solder tab 3916 under core 3910. Similarly, a portion of solder tab 3922 is laterally adjacent to a portion of solder tab 3924 under core 3910. In some embodiments, a significant portion of a length of solder tab 3914 is laterally adjacent to a significant portion of a length of solder tab 3916, and a significant portion of a length of solder tab 3922 is laterally adjacent to a significant portion of a length of solder tab 3924. Lengths of solder tabs 3914, 3922 are analogous to length 406 of solder tab 312 (FIG. 4), and lengths of solder tabs 3916, 3924 are analogous to length 408 of solder tab 314 (FIG. 4). In one embodiment, at least 20% of the length of solder tab 3914 is laterally adjacent to at least 20% of the length of solder tab 3916, and at least 20% of the length of solder tab 3922 is laterally adjacent to at least 20% of the length of solder tab 3924. In an alternate embodiment, at least 40% of the length of solder tab 3914 is laterally adjacent to at least 40% of the length of solder tab 3916, and at least 40% of the length of solder tab 3922 is laterally adjacent to at least 40% of the length of solder tab 3924.

FIG. 41 is a top plan view of one PCB footprint 4100 that may be used to configure inductor 3900 as a two winding coupled inductor, where each winding has two turns. Footprint 4100 includes solder pads 4102, 4104, 4106, 4108, 4110, 4112, 4114, 4116, which respectively connect to solder tabs 3912, 3914, 3916, 3918, 3920, 3922, 3924, 3926. A PCB trace 4118 connects solder pads 4104, 4106, and a PCB trace 4120 connects solder pads 4112, 4114. PCB traces 4118, 4120 are each relatively wide and short, thereby providing a low resistance connection between solder pads 4104, 4106 and solder pads 4112, 4114. Accordingly, the configuration of inductor 3900 promotes establishing a low resistance connection between windings 3902, 3904 and between windings 3906, 3908. Thus, although inductor 3900 has only single-turn windings, which promote low cost and ease of manufacturing, inductor 3900 can advantageously be configured as a relatively low resistance two-turn, coupled inductor.

Figure 42:
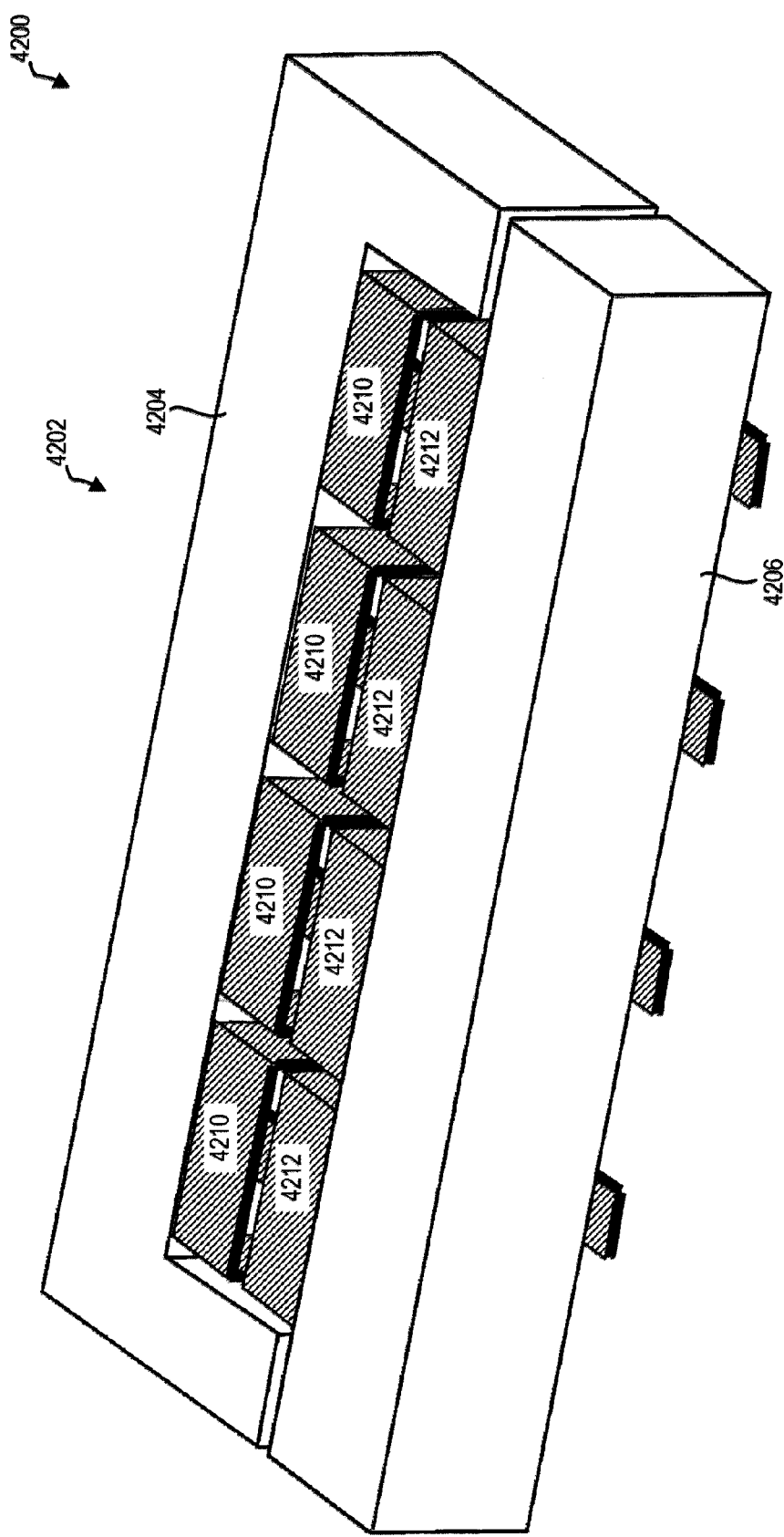
FIG. 42 shows a perspective view of one coupled inductor configurable as a two-turn coupled inductor, according to an embodiment.
Figure 43:
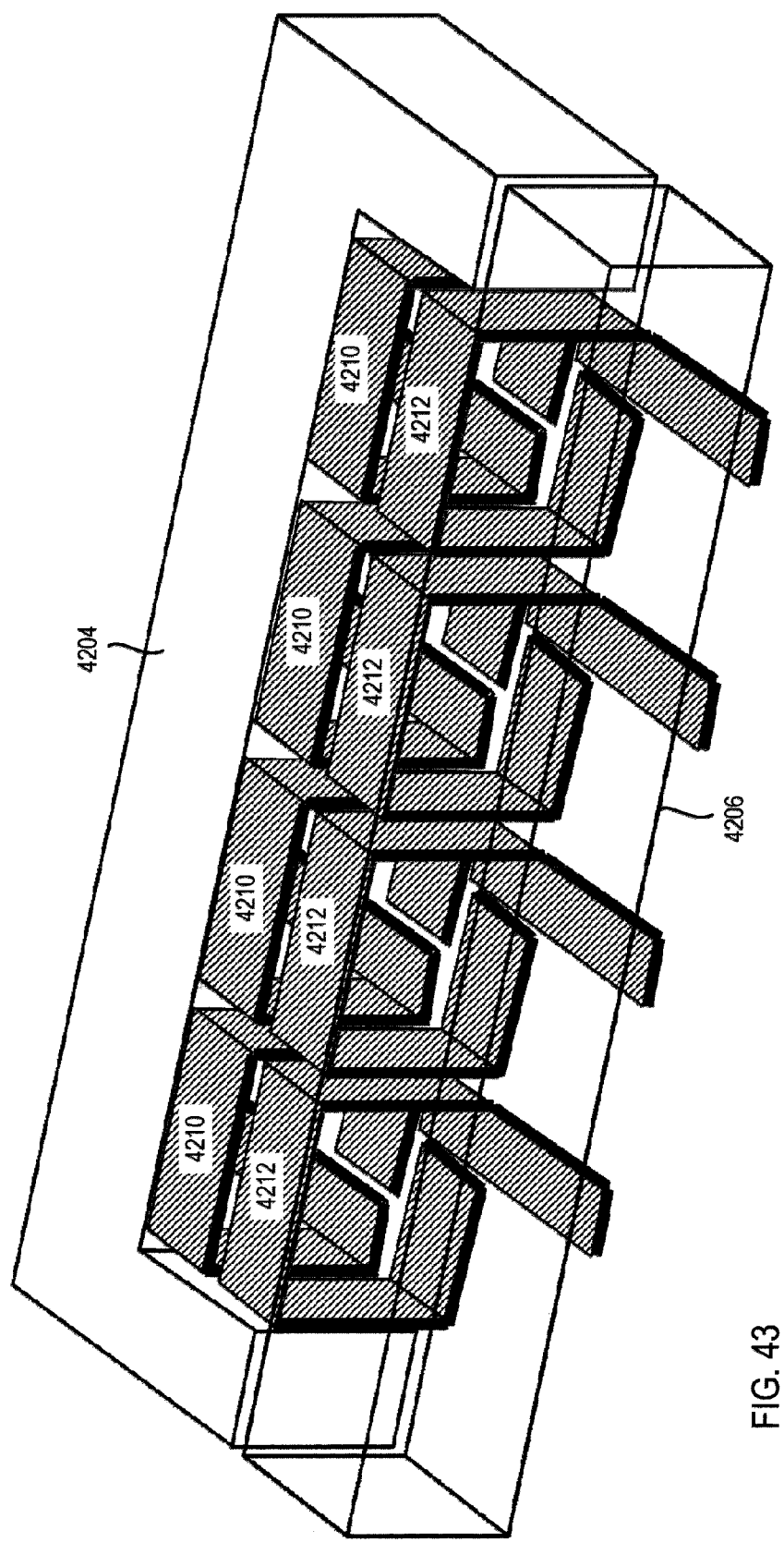
FIG. 43 shows a perspective view of the coupled inductor of FIG. 42 with an end magnetic element shown as transparent.
Figure 44:
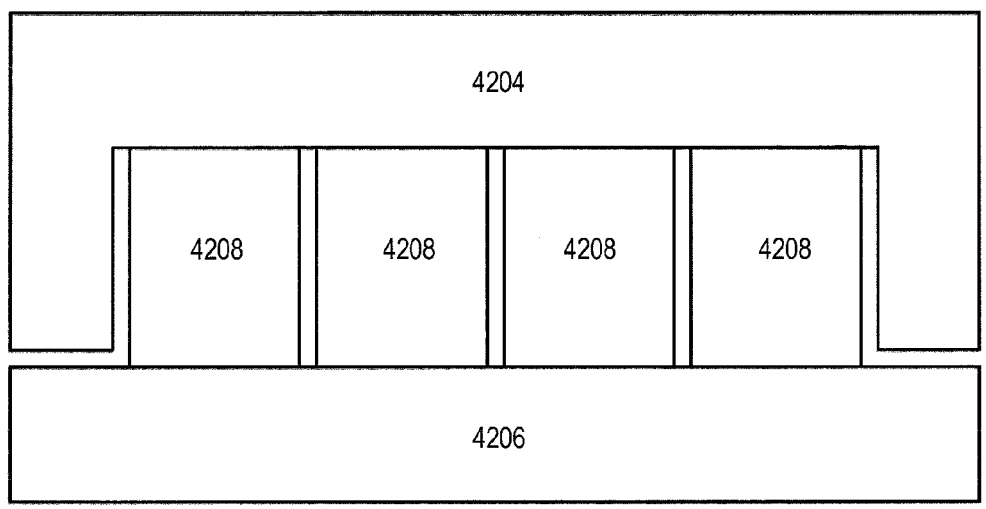
FIG. 44 is a top plan view of the coupled inductor of FIG. 42 with windings removed.

FIG. 42 shows a perspective view of one coupled inductor 4200, which is another coupled inductor including single-turn windings that can be configured as a coupled inductor, where each phase includes a two-turn winding. FIG. 43 shows a perspective view of coupled inductor 4200 with an end magnetic shown as transparent, and FIG. 44 is a top plan view of coupled inductor 4400 with windings removed. FIGS. 42-44 should be referred to together in the following discussion of inductor 4200.

Coupled inductor 4200 includes a core 4202 including first and second end magnetic elements 4204, 4206 and N connecting elements 4208 disposed between and connecting first and second end magnetic elements 4204, 4206, where N is an integer greater than one and represents the number of phases of coupled inductor 4200. A respective single-turn first foil winding 4210 and a respective single-turn second foil winding 4212 are wound at least partially around each connecting magnetic element 4208.

FIG. 45 shows a perspective view of first and second windings 4210, 4212 separated from each other for illustrative clarity, and FIG. 46 shows a perspective view of first and second windings 4210, 4212 when in close proximity, such as they would be when installed on a common connecting magnetic element 4208. Each first winding 4210 forms respective solder tabs 4214, 4216 suitable for surface mount soldering to a PCB, and each second winding 4212 forms respective solder tabs 4218, 4220 suitable for surface mount soldering to a PCB. A shown in FIG. 46, for each connecting magnetic element 4208, a portion of solder tab 4216 is laterally adjacent to a portion of solder tab 4220 under the connecting magnetic element. In some embodiments, a significant portion of a length 4502 of solder tab 4216 is laterally adjacent to a significant portion of a length 4504 of solder tab 4220. In one embodiment, at least 20% of length 4502 of solder tab 4216 is laterally adjacent to at least 20% of length 4504 of solder tab 4220. In an alternate embodiment, at least 40% of length 4502 of solder tab 4216 is laterally adjacent to at least 40% of length 4504 of solder tab 4220.

FIG. 47 shows a PCB footprint 4700, which is an example of one PCB footprint that can be used with inductor 4200. Footprint 4700 includes solder pads 4702, 4704, 4706, 4708 for respectively soldering to solder tabs 4214, 4216, 4218, 4220 of first and second windings 4210, 4212 of a given connecting magnetic element 4208. Accordingly, one instance of footprint 4700 may used for each connecting element 4208 or phase of coupled inductor 4200. A PCB trace 4710 connects pads 4704, 4708. The short length of PCB trace 4710 provides a low resistance connection between pads 4704, 4708. Accordingly, the configuration of coupled inductor 4200 advantageously allows for a low resistance connection between each first and second winding 4210, 4212 of a phase, thereby advantageously enabling a low resistance multi-turn configuration without manufacturing difficulties that are typically associated with multi-turn windings. In alternate embodiments (not shown), at least one additional single-turn winding is wound around each connecting magnetic element 4208, thereby allowing each winding per phase to have three or more turns.

Figure 48:
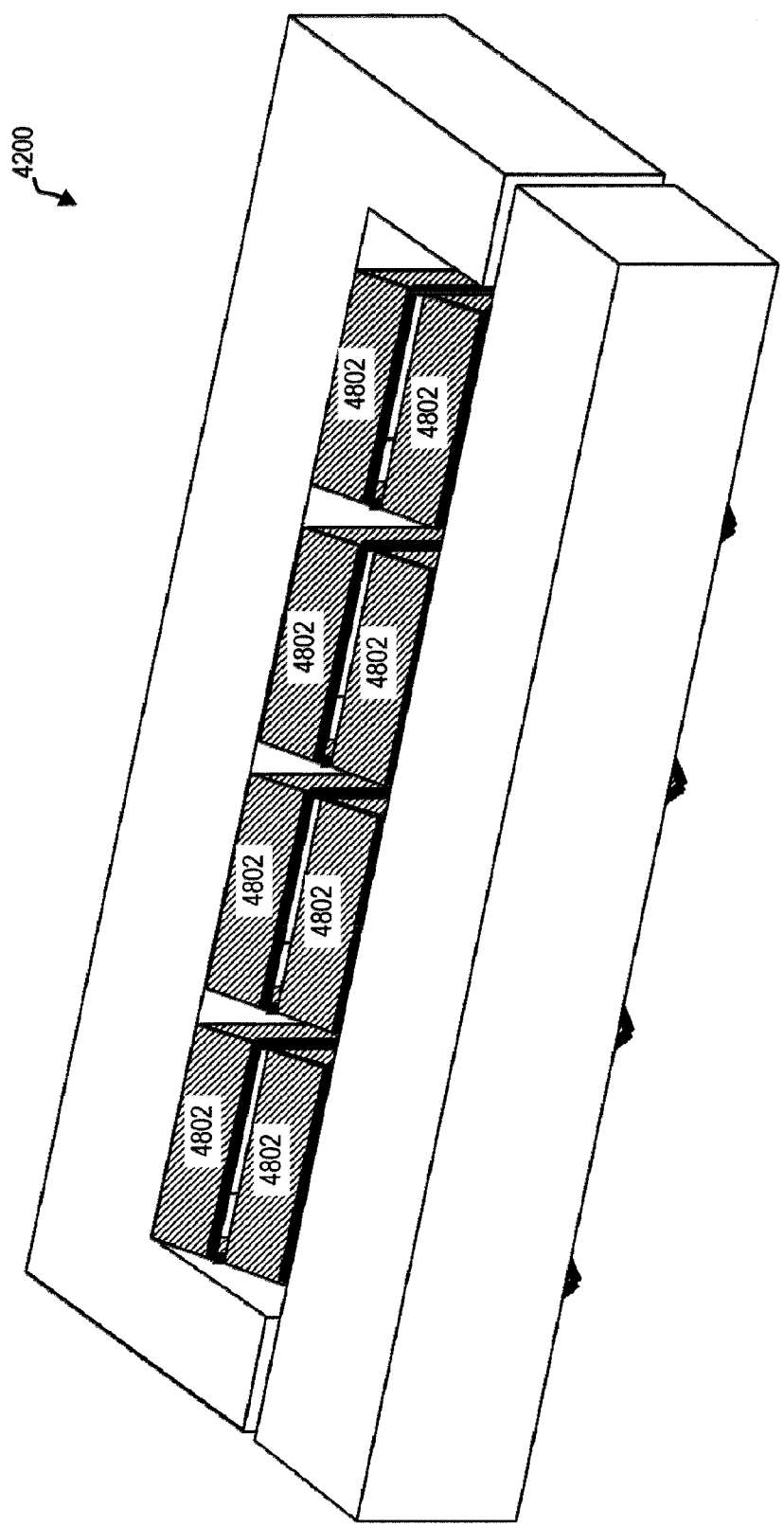
FIG. 48 shows a perspective view of an alternate embodiment of the coupled inductor of FIG. 42.
Figure 49:
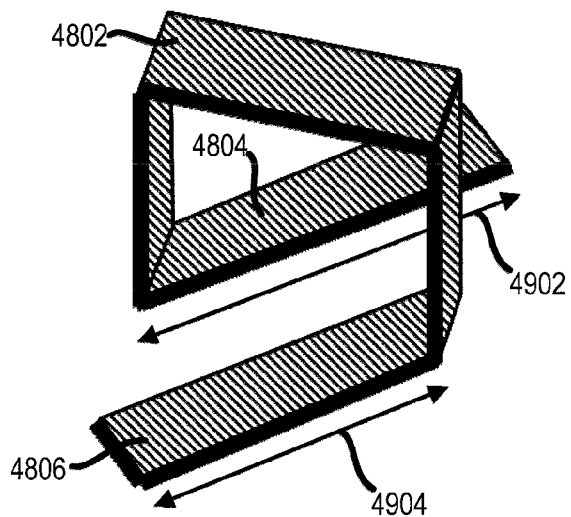
FIG. 49 shows a perspective view of one winding of the coupled inductor of FIG. 48.
Figure 50:
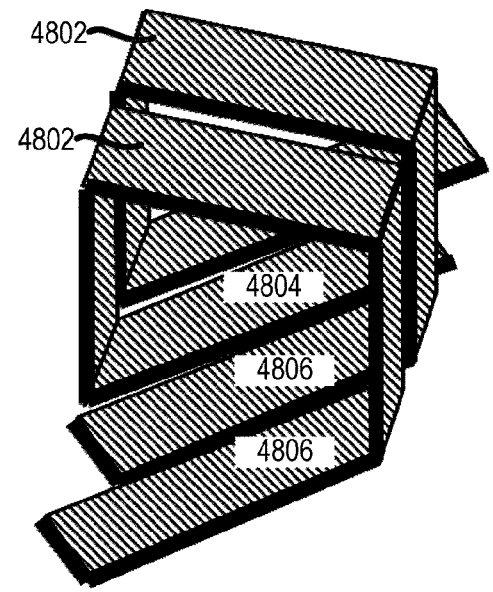
FIG. 50 shows a perspective view of two windings of the coupled inductor of FIG. 48.

FIG. 48 shows a perspective view of one coupled inductor 4800, which is an alternate embodiment of inductor 4200 (FIG. 42). Inductor 4800 differs from inductor 4200 in the configuration of its windings. In particular, each connecting magnetic element of coupled inductor 4800 includes two instances of single turn foil winding 4802, each being wound at least partially around the connecting magnetic element. FIG. 49 shows a perspective view of winding 4802, and FIG. 50 shows a perspective view of two instances of winding 4802 when in close proximity, such as they would be when installed on a common connecting magnetic element. Winding 4802 forms solder tabs 4804, 4806 suitable for surface mount soldering to a PCB. As shown in FIG. 50, for each connecting element, a solder tab 4806 of one winding is laterally adjacent to a solder tab 4804 of another winding, thereby allowing for connection of the two solder tabs by a short, wide PCB trace. The short, wide PCB trace has a relatively low resistance, thereby allowing for a low resistance series connection of two windings on a common connecting magnetic element. Therefore, coupled inductor 4800 is configurable as a two-turn, low resistance coupled inductor without manufacturing difficulties that are typically associated with multi-turn windings. In some embodiments, such as shown in FIGS. 49-50, a significant portion of a length 4902 of a solder tab 4804 is laterally adjacent to a significant portion of a length 4904 of a solder tab 4806 for each connecting element. In one embodiment, at least 20% of length 4902 of solder tab 4804 is laterally adjacent to at least 20% of length 4904 of solder tab 4806, for each connecting element. In an alternate embodiment, at least 40% of length 4902 of solder tab 4804 is laterally adjacent to at least 40% of length 4904 of solder tab 4806, for each connecting element.

Figure 51:
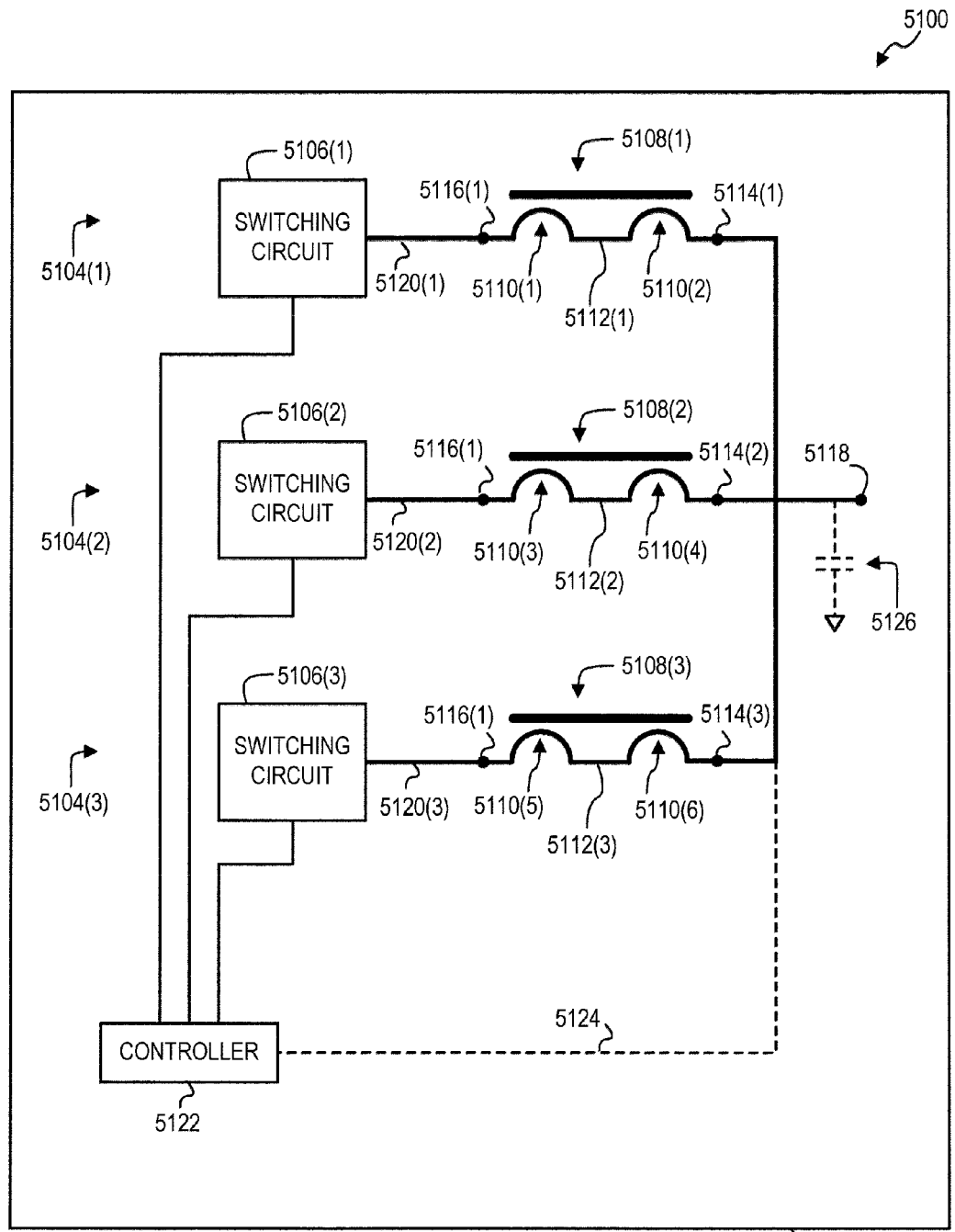
FIG. 51 shows a power supply, according to an embodiment.

One possible application of the inductors disclosed herein is in power supplies. For example, FIG. 51 schematically shows one power supply 5100, which is one possible application of the inductors discussed herein. Power supply 5100 includes a PCB 5102 for supporting and electrically connecting components of power supply 5100. PCB 5102 could alternately be replaced with a number of separate, but electrically interconnected, PCBs.

Power supply 5100 is shown as including three phases 5104, where each phase includes a respective switching circuit 5106 and a multi-winding inductor 5108. However, power supply 5100 could be modified to have a different number of phases 5104, including only a single phase. Each multi-winding inductor 5108 is configured in power supply 5100 to be a multi-turn inductor. In particular, each inductor 5108 includes at least two windings 5110, where windings 5110 of each inductor 5108 are electrically connected in series by one or more traces 5112 of PCB 5102 to form a multi-turn winding. In the example of FIG. 51, inductor 5108 (1) includes windings 5110(1), 5110(2) electrically connected in series by trace 5112(1) to form a two turn winding. Inductors 5108(2) and 5108(3) are similarly configured in the example of FIG. 51 such that each inductor includes a two-turn winding.

Figure 52:
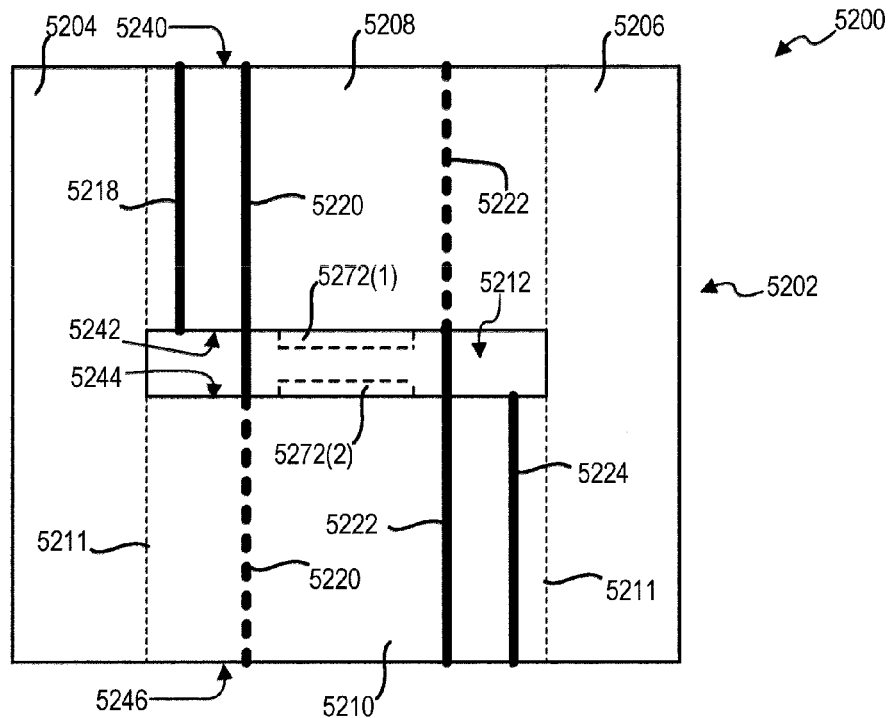
FIG. 52 is a top plan view of another multi-winding inductor configurable as a two-turn coupled inductor, according to an embodiment.

Examples of multi-winding inductors 5108 include inductor 300 (FIG. 3), inductor 600 (FIG. 6), inductor 900 (FIG. 9), inductor 1200 (FIG. 12), inductor 5700 (FIG. 57), inductor 6200 (FIG. 62), inductor 6600 (FIG. 66), and combinations thereof. In alternate embodiments, at least two instances of inductor 5108 are part of a common coupled inductor, such as inductor 3900 (FIG. 39), inductor 4200 (FIG. 42), inductor 4800 (FIG. 48), or inductor 5200 (FIG. 52). Furthermore, power supply 5100 could be modified by replacing at least some of multi-winding inductors 5108 with multi-turn inductors, such as inductor 1500 (FIG. 15), drop-in inductor 1800 (FIG. 18), drop-in inductor 2300 (FIG. 23), drop-in inductor 2900 (FIG. 29), drop-in inductor 3500 (FIG. 35), or combinations thereof.

The multi-turn winding (e.g., series combination of windings 5110) of each multi-turn inductor 5108 has a respective first end 5114 and a respective second end 5116. First and second ends 5114, 5116, for example, form surface mount solder tabs suitable for surface mount soldering to PCB 5102. For example, in an embodiment where inductors 5108 are instances of inductor 300 (FIG. 3), first end 5114 represents solder tab 316, and second end 5116 represents solder tab 318. Each first end 5114 is electrically connected to a common first node 5118, such as via one or more PCB traces. Each second end 5116 is electrically connected to a respective switching circuit 5106, such as by a respective PCB trace 5120. Switching circuits 5106 are configured and arranged to switch second end 5116 of their respective multi-turn winding between at least two different voltages. Controller 5122 controls switching circuits 5106, and controller 5122 optionally includes a feedback connection 5124, such as to first node 5118. First node 5118 optionally includes a filter 5126.

In some embodiments, controller 5122 controls switching circuits 5106 such that each switching circuit 5106 operates out of phase from each other switching circuit 5106. Stated differently, in such embodiments, the switched waveform provided by each switching circuit 5106 to its respective second end 5116 is phase shifted with respect to the switched waveform provided by each other switching circuit 5106 to its respective second end 5116. For example, in an embodiment of power supply 5100 including three phases 5104, each switching circuit 5106 provides a switched waveform to its respective second end 5116 that is about 120 degrees out of phase with the switched waveforms provided by each other switching circuit 5106 to its respective second end 5116.

Power supply 5100 can be configured and arranged to have a variety of configurations. For example, switching circuits 5106 may switch their respective second ends 5116 between an input voltage node (not shown) and ground, such that power supply 5100 is configured as a buck converter, first node 5118 is an output voltage node, and filter 5126 is an output filer. In this example, each switching circuit 5106 includes at least one high side switching device and at least one catch diode, or at least one high side switching device and at least one low side switching device. In the context of this document, a switching device includes, but is not limited to, a bipolar junction transistor, a field effect transistor (e.g., a N-channel or P-channel metal oxide semiconductor field effect transistor, a junction field effect transistor, or a metal semiconductor field effect transistor), an insulated gate bipolar junction transistor, a thyristor, or a silicon controlled rectifier.

As another example, power supply 5100 can be configured as a boost converter such that first node 5118 is an input power node, and switching circuits 5106 switch their respective second end 5116 between an output voltage node (not shown) and ground. Additionally, power supply 5100 can be configured, for example, as a buck-boost converter such that first node 5118 is a common node, and switching circuits 5106 switch their respective second end 5116 between an output voltage node (not shown) and an input voltage node (not shown).

Furthermore, as in yet another example, power supply 5100 may form an isolated topology. For example, each switching circuit 5106 may include a transformer, at least one switching device electrically coupled to the transformer's primary winding, and a rectification circuit coupled between the transformer's secondary winding and the switching circuit's respective second end 5116. The rectification circuit optionally includes at least one switching device to improve efficiency.

Figure 56:
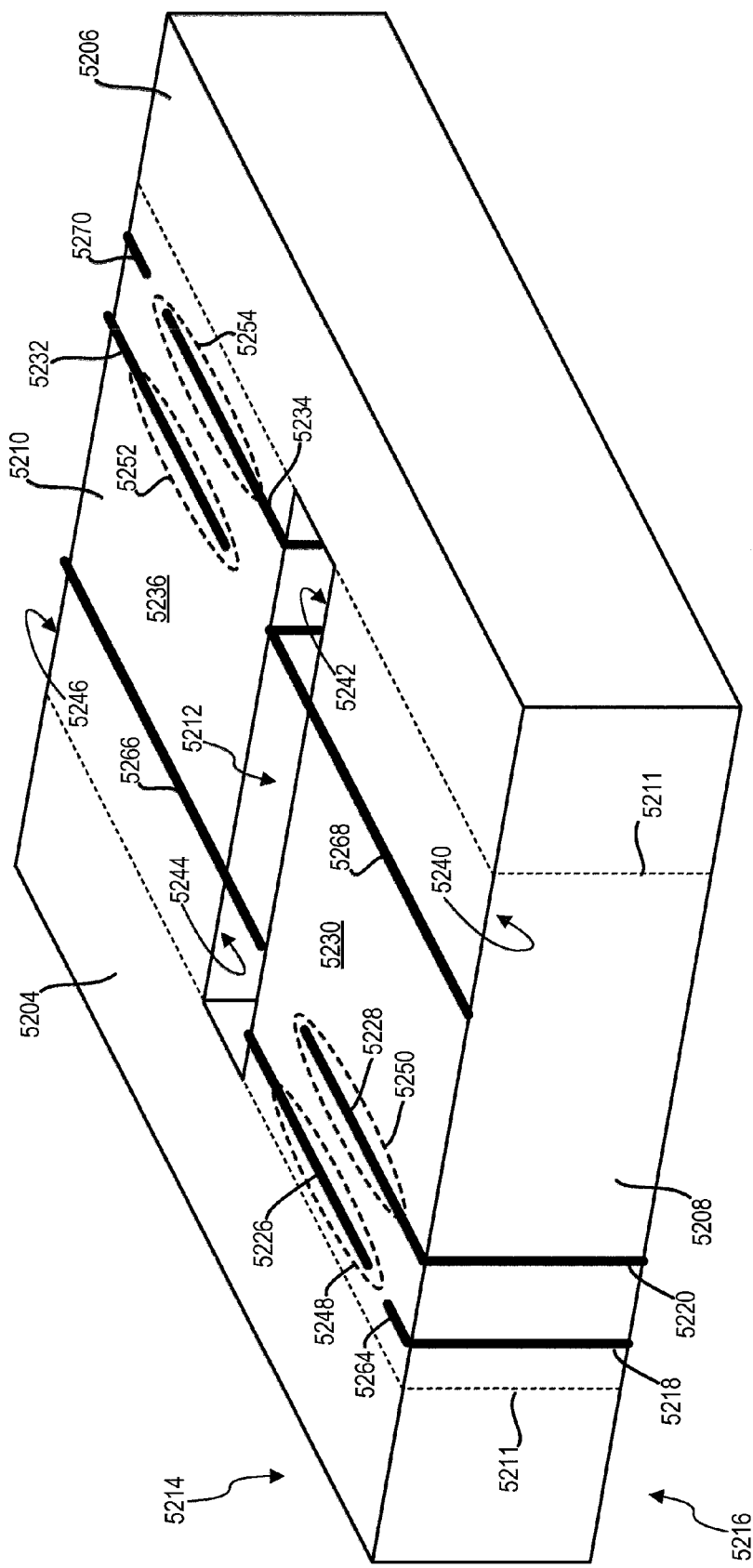
FIG. 56 shows a bottom perspective view of the inductor of FIG. 52.

Discussed below are additional examples of multi-winding inductors configurable as multi-turn inductors. For example, FIG. 52 shows a top plan view of another multi-winding inductor 5200 configurable as a two-turn coupled inductor. FIG. 54 shows a top perspective view of inductor 5200, and FIG. 56 shows bottom perspective view of inductor 5200.

Inductor 5200 includes a magnetic core 5202 including first and second end magnetic elements 5204, 5206 and opposing first and second connecting magnetic elements or legs 5208, 5210. Each leg 5208, 5210 connects to a respective portion of both of end magnetic elements 5204, 5206. Magnetic core 5202 has a passageway 5212 extending from a bottom side 5214 to a top side 5216 of the core. Thus, magnetic core 5202 has a "ladder" configuration where end magnetic elements 5204, 5206 are analogous to ladder rails, and legs 5208, 5210 are analogous to ladder rungs. While dashed lines 5211 delineate legs 5208, 5210 from end magnetic elements 5204, 5206 in FIGS. 52, 54, and 56 to help a viewer distinguish these elements, such dashed lines do not necessarily represent discontinuities in magnetic core 5206. For example, magnetic core 5206 may be a single unit core, or core 5206 may be formed from multiple magnetic elements not necessarily joined along the dashed lines.

Inductor 5200 further includes single-turn windings 5218, 5220, 5222, 5224 which are shown by dashed lines where obscured by magnetic core 5202 in FIG. 52. FIG. 55 shows a perspective view of windings 5218, 5220, 5222, 5224 separated from magnetic core 5202. Windings 5218 and 5220 are wound around first leg 5208, and windings 5222 and 5224 are wound around second leg 5210. As seen from FIGS. 55 and 56, a first end of winding 5218 and a first end of winding 5220 form respective solder tabs 5226, 5228 on a bottom surface 5230 of leg 5208. Similarly, a first end of winding 5222 and a first end of winding 5224 from respective solder tabs 5232, 5234 on a bottom surface 5236 of leg 5210. Solder tabs 5226, 5228 extend from opposite outer sides 5240, 5242 of leg 5208, and solder tabs 5232, 5234 extend from opposite outer sides 5244, 5246 of leg 5210, as shown in FIG. 56.

Solder tabs 5226, 5228, 5232, 5234 are suitable for surface mount soldering to a PCB. An elongated portion 5248 of solder tab 5226 is adjacent to an elongated portion 5250 of solder tab 5228, and an elongated portion 5252 of solder tab 5232 is adjacent to an elongated portion 5254 of solder tab 5234, as shown in FIGS. 55 and 56. In some embodiments, a significant portion of a length 5256 of solder tab 5226 is adjacent to a significant portion of a length 5258 of solder tab 5228, and a significant portion of a length 5260 of solder tab 5232 is adjacent to a significant portion of a length 5262 of solder tab 5234 (see FIGS. 55 and 56). In one embodiment, at least 20% of length 5256 of solder tab 5226 is adjacent to at least 20% of length 5258 of solder tab 5228, and at least 20% of length 5260 of solder tab 5232 is adjacent to at least 20% of length 5262 of solder tab 5234. In an alternate embodiment, at least 40% of length 5256 of solder tab 5226 is adjacent to at least 40% of length 5258 of solder tab 5228, and at least 40% of length 5260 of solder tab 5232 is adjacent to at least 40% of length 5262 of solder tab 5234.

An end of winding 5218 wrapping around side 5240 of leg 5208 forms a solder tab 5264 suitable for surface mount soldering to a PCB, and an end of winding 5224 wrapping around side 5246 of leg 5210 forms a solder tab 5270 suitable for surface mount soldering to a PCB. Although solder tabs 5264 and 5270 are shown as extending along bottom surface 5230 and 5236 of legs 5208 and 5210 respectively, one or more of solder tabs 5264, 5270 could alternately extend away from core 5202. An end of winding 5220 wrapping around side 5242 of first leg 5208 forms a solder tab 5266, and an end of winding 5222 wrapping around side 5244 of second leg 5210 forms a solder tab 5268. In certain embodiments, solder tab 5266 extends away from first leg 5208 towards second leg 5210, and in such embodiments, solder tab 5266 optionally extends along bottom surface 5236 of second leg 5210. Similarly, in some embodiments, solder tab 5268 extends away from second leg 5210 towards first leg 5208, and in such embodiments, solder tab 5268 optionally extends along bottom surface 5230 of first leg 5208. Solder tabs 5264, 5266, 5268, 5270 are suitable for surface mount soldering to a PCB. However, in some alternate embodiments, at least one of solder tabs 5264, 5266, 5268, 5270 is replaced with a different type of connector, such as a through-hole pin.

Windings 5218, 5220, 5222, 5224 have, for example, rectangular or square cross sections. In some alternate embodiments, windings 5218, 5220, 5222, 5224 are foil windings. Inductor 5200 can also be modified to have additional windings. For example, in an alternate embodiment, three single-turn windings are wound around each leg 5208, 5210 so that the inductor can be configured as a coupled inductor having three-turn windings by electrically coupling the respective windings of each leg.

Figure 53:
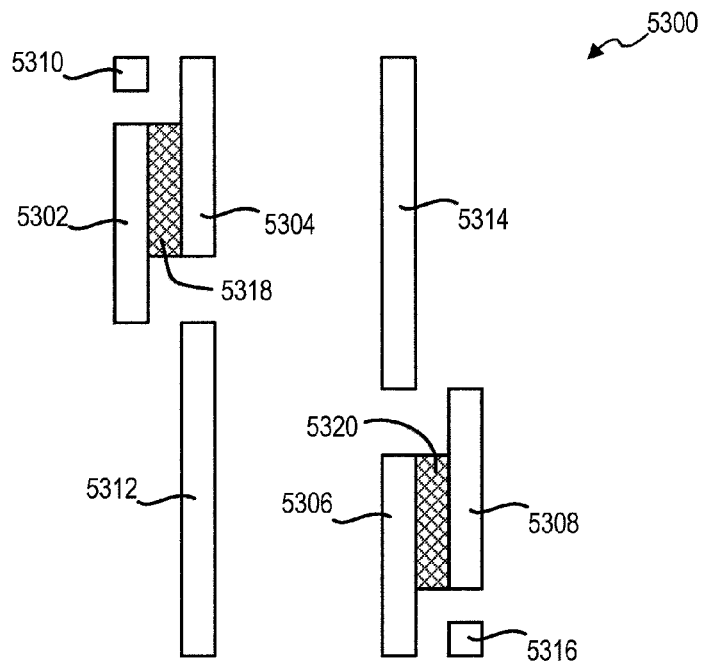
FIG. 53 is a top plan view of one PCB footprint for use with the inductor of FIG. 52, according to an embodiment.

FIG. 53 is a top plan view of one PCB footprint 5300 that can be used to configure inductor 5200 as a two-turn coupled inductor when installed on a PCB. Footprint 5300 includes pads 5302, 5304, 5306, 5308, 5310, 5312, 5314, 5316 for respectively connecting to solder tabs 5226, 5228, 5232, 5234, 5264, 5266, 5268, 5270 of inductor 5200. A PCB trace 5318 electrically couples pads 5302, 5304, and a PCB trace 5320 electrically couples pads 5306, 5308. Thus, single-turn windings 5218, 5220 effectively form single-turn sub-windings of a first two-turn winding, and single turn windings 5222 and 5224 effectively form single-turn sub-windings of a second two-turn winding.

Similar to PCB trace 510 of footprint 500 (FIG. 5), PCB traces 5318 and 5320 are relatively short and wide and therefore provide low resistance connections between pads 5302 and 5304 and between pads 5306, 5308, respectively. Additionally, solder pads 5312, 5314 are relatively long, such as compared to pads 206, 208 of FIG. 2, thereby enabling low resistance connections between the windings and pads 5312, 5314. Accordingly, the configuration of inductor 5200 not only promotes a low resistance series connection between windings when used in a two-turn coupled inductor configuration, but also promotes a low resistance connection between at least some of the end terminals of the series connected windings and a PCB.

In some embodiments of inductor 5200, windings 5218, 5220, 5222, 5224 are installed on magnetic core 5202 by the following process. First, windings 5218, 5220, 5222, 5224 are formed to have an U-shape. Next, windings 5218, 5220 are installed on first leg 5208, and windings 5222, 5224 are installed on second leg 5210. Projecting arms of windings 5218, 5220, 5222, 5224 are then bent to form solder tabs along bottom side 5214. The solder tabs are optionally soldered to a PCB, such as PCB including footprint 5300 discussed above with respect to FIG. 53. Such process does not require separation of core constituent magnetic elements, thereby promoting economical manufacturing of inductor 5200. Additionally, some or all of the process steps are optionally performed solely by a machine, thereby further promoting low manufacturing cost.

Magnetic core 5202 optionally includes one or more "teeth" 5272 disposed between windings 5220, 5222 in passageway 5212. Optional teeth 5272, which are shown only in FIG. 52 for simplicity, increase and control leakage inductance values associated with windings 5218, 5220 and with windings 5222, 5224. Teeth 5272 are formed of magnetic material and decrease the air gap in passageway 5212, thereby increasing leakage inductance values associated with the windings. Although teeth 5272 are shown as extending from both of first and second legs 5208, 5210 into passageway 5212, teeth 5272 could alternately extend from only one of first or second legs 5208, 5210. Leakage inductance values could be adjusted during the design and/or manufacture of inductor 5200 by changing the size and/or quantity of teeth in passageway 5212. For example, the size of teeth 5272 could be decreased during inductor design to increase the air gap, thereby decreasing leakage inductance values. Teeth 5272 could also optionally be configured to saturate at large but normal values of winding current, thereby causing leakage inductance to decrease at large winding current values.

Figure 57:
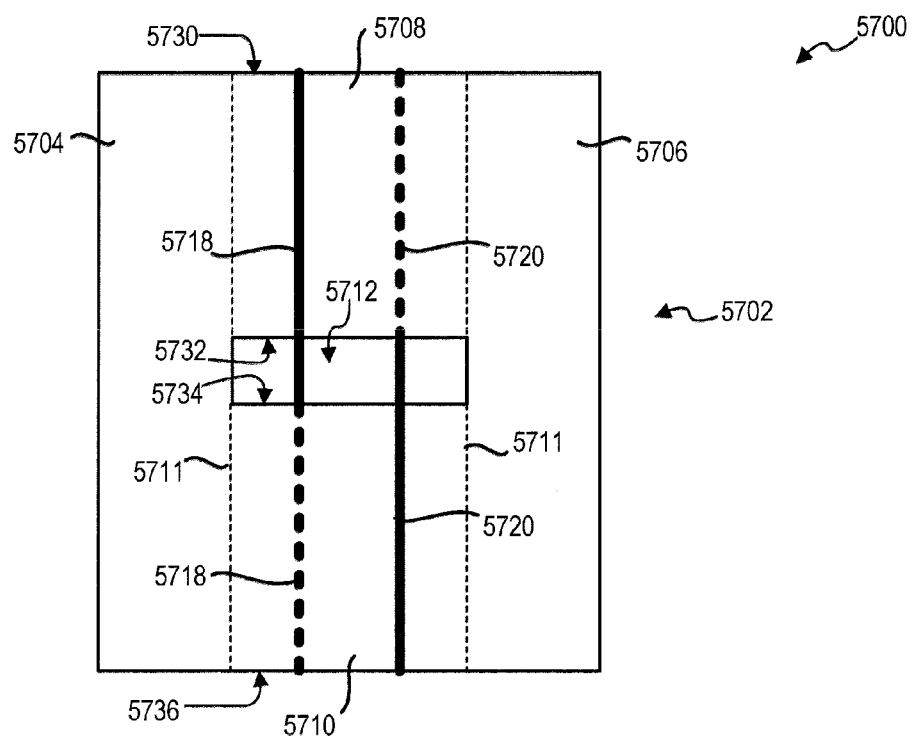
FIG. 57 is a top plan view of another two-winding inductor configurable as a two-turn inductor, according to an embodiment.
Figure 61:
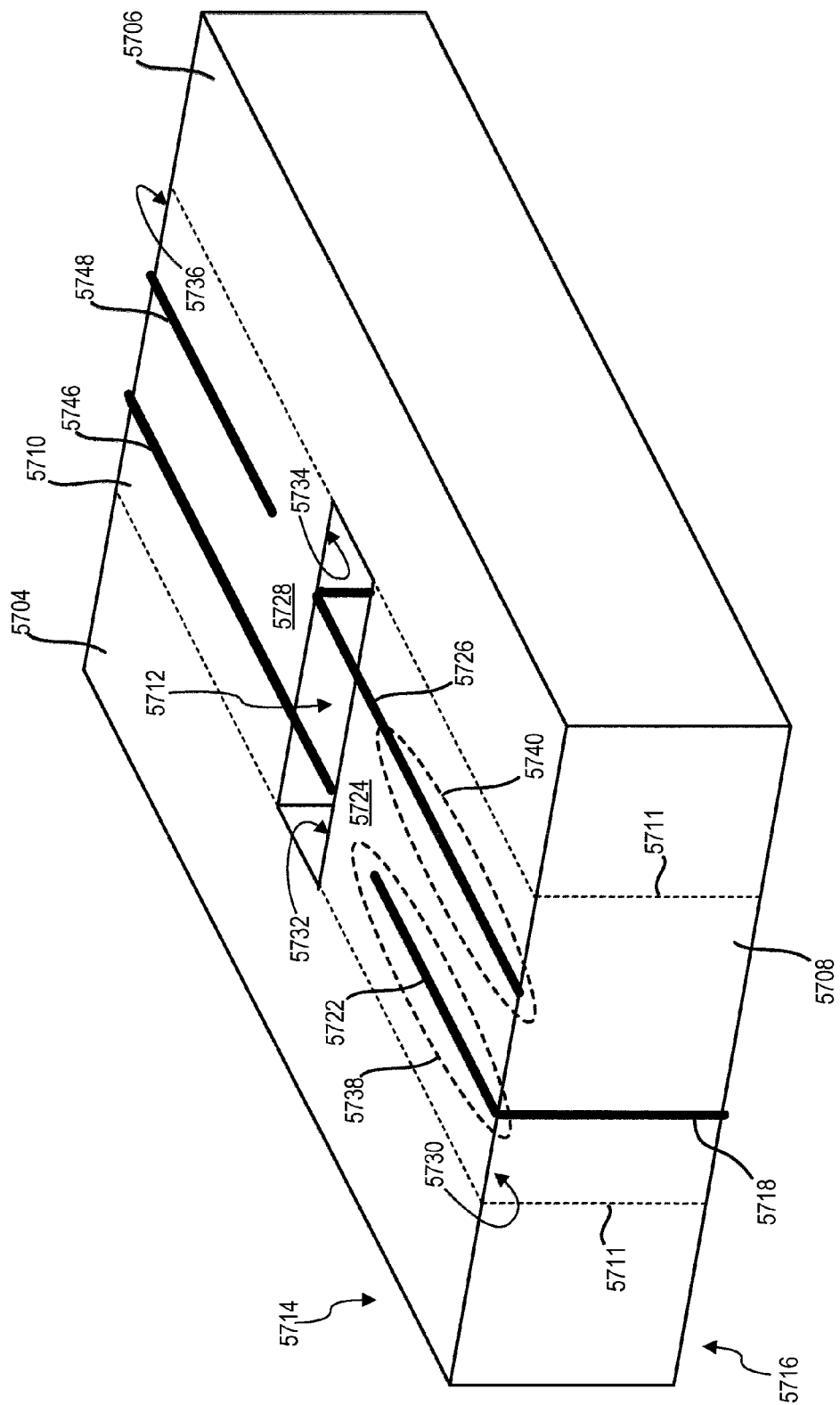
FIG. 61 shows a bottom perspective view of the inductor of FIG. 57.

FIG. 57 shows a top plan view of a two-winding inductor 5700 configurable as a two-turn inductor. FIG. 59 shows a top perspective view of inductor 5700, and FIG. 61 shows bottom perspective view of inductor 5700.

Inductor 5700 includes a magnetic core 5702 including first and second end magnetic elements 5704, 5706 and opposing first and second legs 5708, 5710. Each leg 5708, 5710 connects to a respective portion of both of end magnetic elements 5704, 5706. Magnetic core 5702 has a passageway 5712 extending from a bottom side 5714 to a top side 5716 of the core. While dashed lines 5711 delineate legs 5708, 5710 from end magnetic elements 5704, 5706 in FIGS. 57, 59, and 61 to help a viewer distinguish these elements, such dashed lines do not necessarily represent discontinuities in magnetic core 5702. For example, magnetic core 5702 may be a single unit core, or core 5702 may be formed from multiple magnetic elements not necessarily joined along the dashed lines.

Inductor 5700 further includes single-turn windings 5718, 5720 and are shown by dashed lines where obscured by magnetic core 5702 in FIG. 57. FIG. 60 shows a perspective view of windings 5718, 5710 separated from magnetic core 5702. Winding 5718 is wound around first leg 5708, and winding 5720 is wound around second leg 5710. As seen from FIGS. 60 and 61, a first end of winding 5718 forms a solder tab 5722 on a bottom surface 5724 of leg 5708. A first end of winding 5720 also forms a solder tab 5726 on bottom surface 5724 of leg 5708. Solder tab 5722, 5726 extends from opposite outer sides 5730, 5732 of leg 5708.

Solder tabs 5722, 5726 are suitable for surface mount soldering to a PCB. An elongated portion 5738 of solder tab 5722 is adjacent to an elongated portion 5740 of solder 5726, as shown in FIGS. 60 and 61. In some embodiments, a significant portion of a length 5742 of solder tab 5722 is adjacent to a significant portion of a length 5744 of solder tab 5726 (see FIGS. 60 and 61). In one embodiment, at least 20% of length 5742 of solder tab 5722 is adjacent to at least 20% of length 5744 of solder tab 5726. In an alternate embodiment, at least 40% of length 5742 of solder tab 5722 is adjacent to at least 40% of length 5744 of solder tab 5726.

An end of winding 5718 wrapping around side 5732 of first leg 5708 forms a solder tab 5746, and an end of winding 5720 wrapping around side 5736 of second leg 5710 forms a solder tab 5748. In certain embodiments, solder tab 5746 extends away from first leg 5708 towards second leg 5710, and in such embodiments, solder tab 5746 optionally extends along bottom surface 5728 of second leg 5710. Solder tab 5478 also extends way from side 5736 toward outer side 5734 of second leg 5710 to form a solder tab along bottom surface 5728 of second leg 5710 in some embodiments. Solder tabs 5746, 5748 are suitable for surface mount soldering to a PCB. However, in some alternate embodiments, at least one of solder tabs 5746, 5748 is replaced with a different type of connector, such as a through-hole pin.

Figure 58:
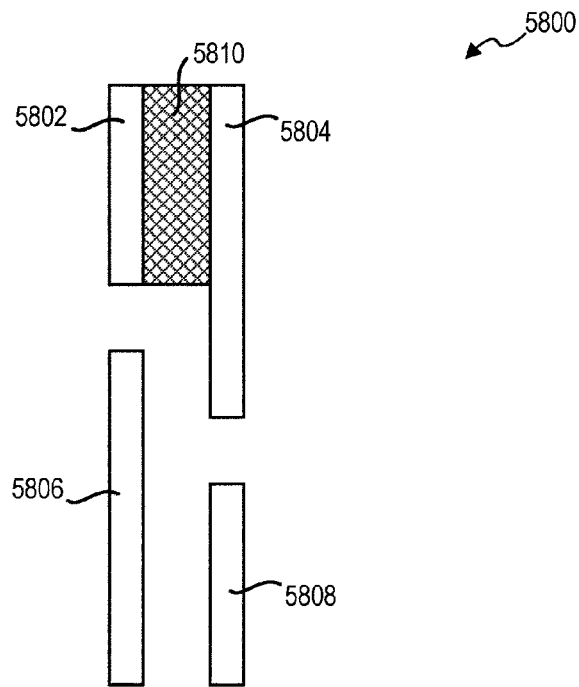
FIG. 58 is a top plan view of one PCB footprint for use with the inductor of FIG. 57, according to an embodiment.

FIG. 58 is a top plan view of one PCB footprint 5800 that can be used to configure inductor 5700 as a two-turn inductor when installed on a PCB. Footprint 5800 includes pads 5802, 5804, 5806, 5808 for respectively connecting to solder tabs 5722, 5726, 5746, 5748 of inductor 5700. A PCB trace 5810 electrically couples pads 5802, 5804. Thus, single-turn windings 5718 and 5720 effectively form single-turn sub-windings of a two-turn winding.

Similar to PCB trace 510 of footprint 500 (FIG. 5), PCB trace 5810 is relatively short and wide and therefore provide low resistance connections between pads 5802 and 5804. Additionally, solder pads 5806, 5808 are relatively long, such as compared to pads 206, 208 of FIG. 2, thereby enabling low resistance connections between the windings and pads 5806, 5808. Accordingly, the configuration of inductor 5700 not only promotes a low resistance series connection between windings when used in a two-turn inductor configuration, but also promotes a low resistance connection between ends of the two-turn winding and a PCB.

Figure 62:
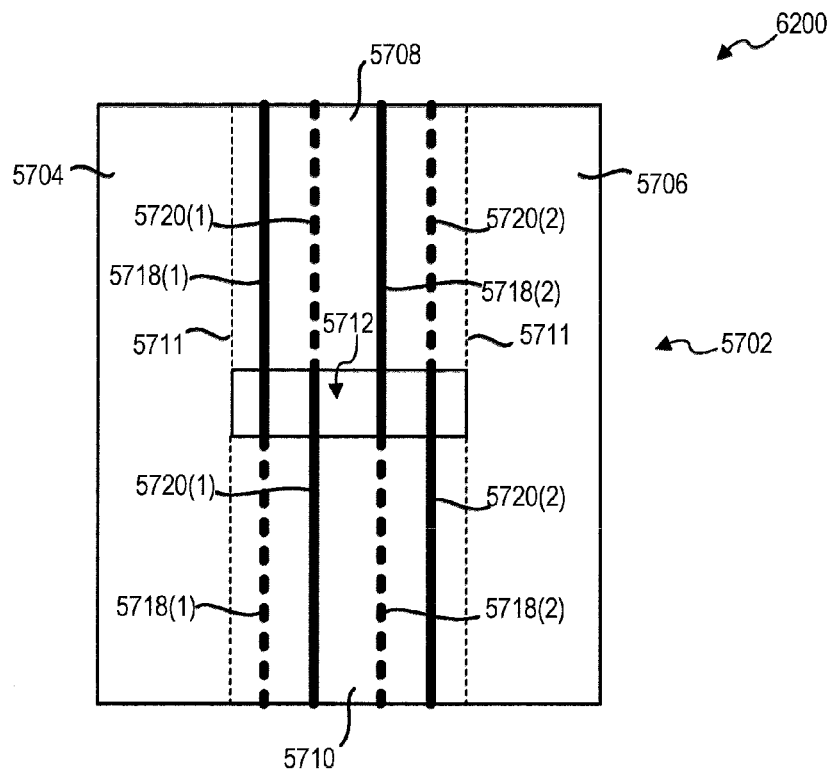
FIG. 62 is a top plan view of a four-winding inductor configurable as a four-turn inductor, according to an embodiment.
Figure 63:
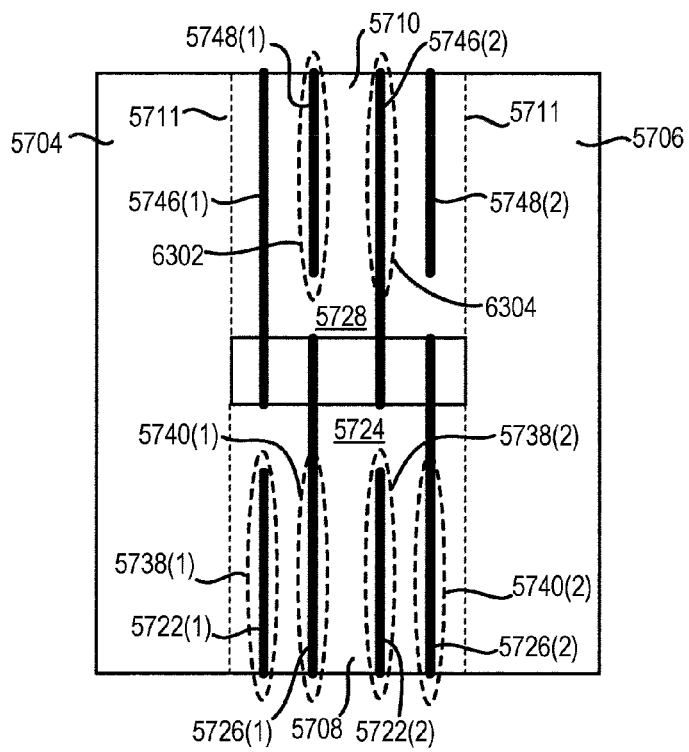
FIG. 63 is a bottom plan view of the inductor of FIG. 62.
Figure 65:
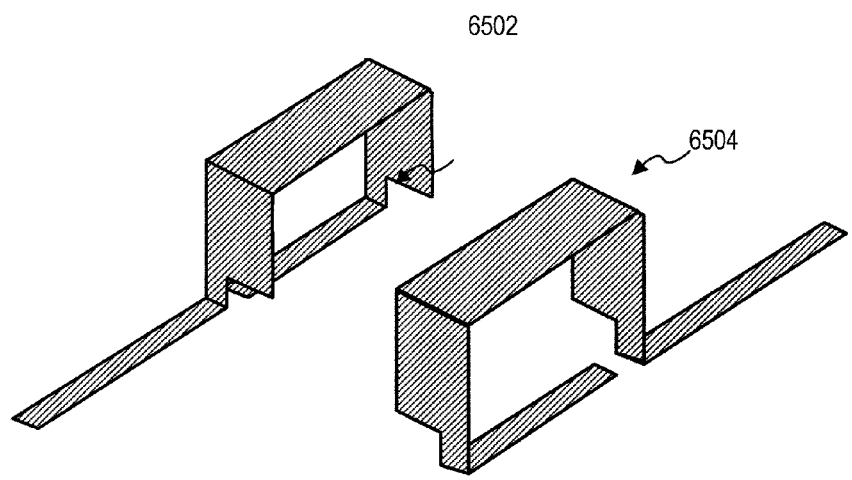
FIG. 65 shows a perspective view of an alternate embodiment of the windings of the inductor of FIG. 57.

In some embodiments of inductor 5700, windings 5718, 5720 are installed on magnetic core 5702 by a process similar to that discussed above with respect to inductor 5200 (FIG. 52). Windings 5718, 5720 have, for example, rectangular or square cross sections. In some alternate embodiments, windings 5718, 5720 are foil windings. For example, FIG. 65 shows a perspective view of windings 6502, 6504, which are foil winding embodiments of windings 5718, 5720. Inductor 5700 can also be modified to have additional windings. For example, FIG. 62 shows a top plan view of an inductor 6200, which is an alternate embodiment of inductor 5700 including two instances of winding 5718 wound around first leg 5708 and two instances of winding 5720 wound around second leg 5710. Windings 5718, 5720 are shown by dashed lines where obscured by magnetic core 5702 in FIG. 62. FIG. 63 shows a bottom plan view of inductor 6200.

Like inductor 5700 (FIG. 57), a first end of each winding 5718 forms a respective solder tab 5722 on bottom surface 5724 of first leg 5708, and a second end of each winding 5718 forms a respective solder tab 5746 on bottom surface 5728 of second leg 5710. Additionally, a first end each winding 5720 forms a respective solder tab 5726 on bottom surface 5724 of first leg 5708, and a second end of each winding 5720 forms a respective solder tab 5748 on bottom surface 5728 of second leg 5710. A four-turn inductor can be formed by electrically coupling solder tab 5722(1) to solder tab 5726(1), solder tab 5748(1) to solder tab 5746(2), and solder tab 5722(2) to solder tab 5726(2).

Figure 64:
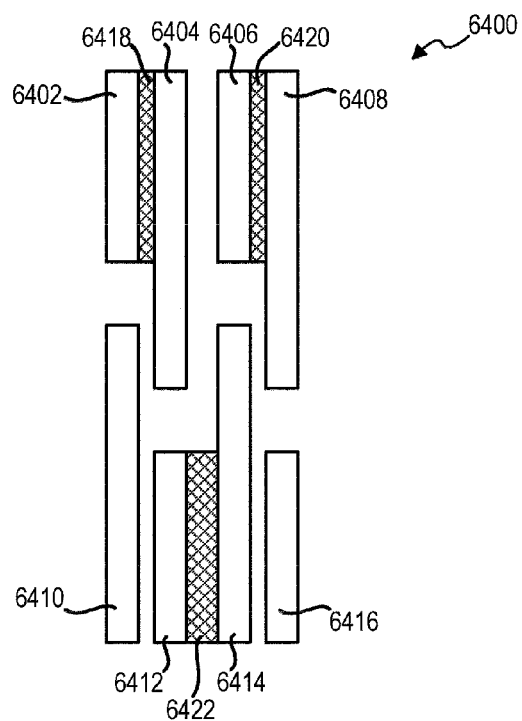
FIG. 64 is a top plan view of one PCB footprint for use with the inductor of FIG. 62, according to an embodiment.

For example, FIG. 64 shows a top plan view of one PCB footprint 6400 that can be used to configure inductor 6200 as a four-turn inductor when installed on a PCB. Footprint 6400 includes pads 6402, 6404, 6406, 6408, 6410, 6412, 6414, 6416 for respectively connecting to solder tabs 5722(1), 5726(1), 5722(2), 5726(2), 5746(1), 5748(1), 5746(2), and 5748(2) of inductor 6200. A PCB trace 6418 electrically couples pads 6402 and 6404, a PCB trace 6420 electrically couples pads 6406 and 6408, and a PCB trace 6422 electrically couples pads 6412 and 6414. Thus, single turn windings 5718(1), 5720(1), 5718(2), and 5720(2) effectively form single-turn sub-windings of a four-turn winding. Pads 6410, 6416 serve as terminals at respective ends of the four terminal winding.

An elongated portion 5738(1) of solder tab 5722(1) is adjacent to an elongated portion 5740(1) of solder 5726(1), an elongated portion 5738(2) of solder tab 5722(2) is adjacent to an elongated portion 5740(2) of solder tab 5726(2), and an elongated portion 6302 of solder tab 5748(1) is adjacent to an elongated portion 6304 of solder tab 5746(2). Accordingly, windings 5718, 5720 can be connected by relatively short and wide PCB solder traces, thereby enabling low resistance connections between the windings. For example, PCB traces 6418, 6420, and 6422, which connect windings 5718, 5720 in footprint 6400, are relatively short and wide, thereby enabling forming a relatively low resistance four-turn inductor using single-turn winding inductor 6200 with footprint 6400. Additionally, solder tabs 5746(1) and 5748(2) are relatively long, thereby enabling low resistance connections between ends of the effective four-turn windings and pads 6410, 6416.

Figure 66:
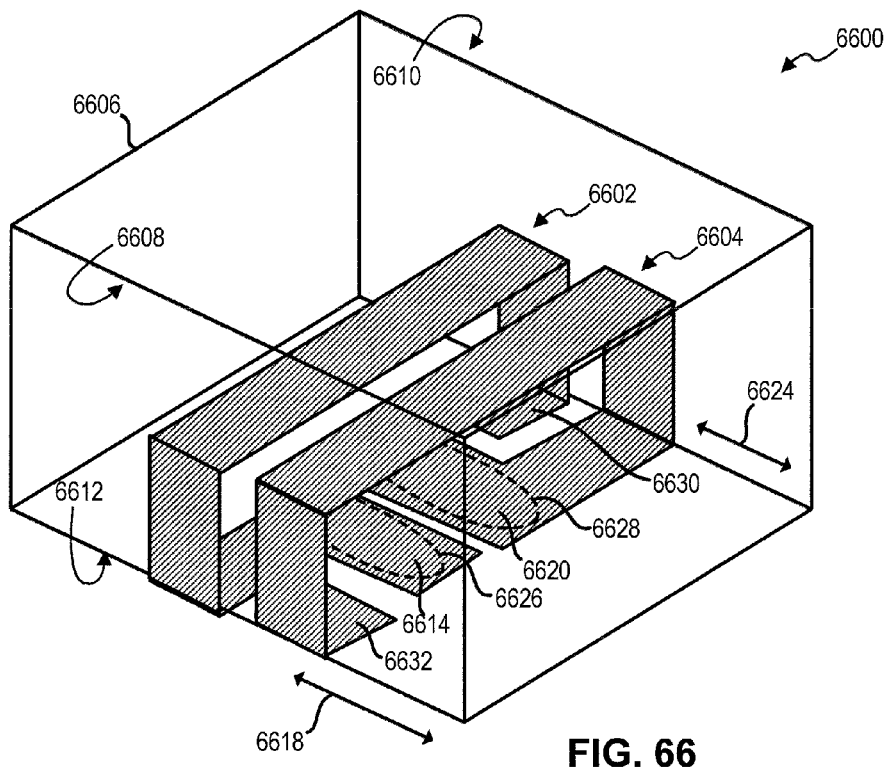
FIG. 66 shows a perspective view of another two-winding inductor configurable as a two-turn inductor, according to an embodiment.
Figure 67:
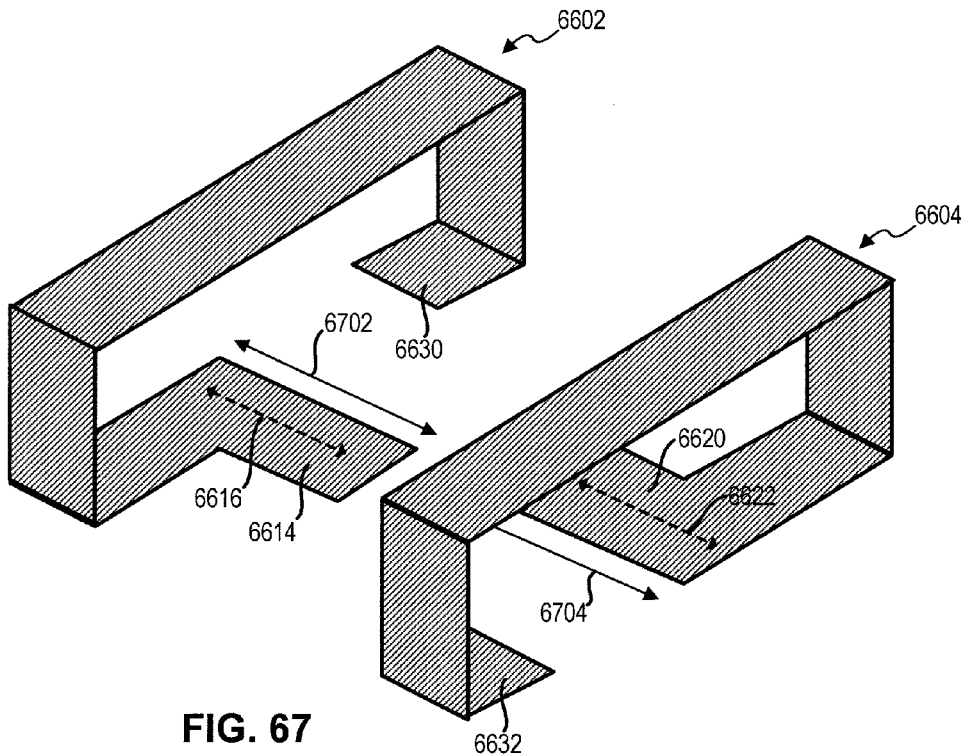
FIG. 67 shows a perspective view of the windings of the inductor of FIG. 66.

FIG. 66 shows a perspective view of a two-winding inductor 6600 configurable as a two-turn inductor. Inductor 6600 includes single-turn staple windings 6602, 6604 passing through a magnetic core 6606 from a first outer side 6608 to an opposite second outer side 6610 of core 6606. Magnetic core 6606 further includes a bottom side 6612 between first and second outer sides 6608, 6610. Only the outline of core 6606 is shown in FIG. 66 so that windings 6602, 6604 are visible. FIG. 67 shows a perspective view of windings 6602, 6604 separated from core 6606. In certain embodiments, windings 6602, 6604 are foil windings, such as shown in FIGS. 66 and 67.

One end of winding 6602 wraps around first outer side 6608 of core 6606 to form a solder tab 6614 on bottom side 6612 of magnetic core 6606. An axis of elongation 6616 of solder tab 6614 is parallel to a lengthwise direction 6618 of first outer side 6608. Similarly, one end of winding 6604 wraps around second outer side 6610 of core 6606 to form a solder tab 6620 on bottom side 6612 of core 6606. An axis of elongation 6622 of solder tab 6620 is parallel to a lengthwise direction 6624 of second outer side 6610. Solder tabs 6614, 6620 are suitable for surface mount soldering to a PCB.

An elongated portion 6626 of solder tab 6614 is adjacent to an elongated portion 6628 of solder tab 6620 along bottom side 6612. In some embodiments, a significant portion of a length 6702 of solder tab 6614 is laterally adjacent to a significant portion of a length 6704 of solder tab 6620. In one embodiment, at least 20% of length 6702 of solder tab 6614 is laterally adjacent to at least 20% of length 6704 of solder tab 6620. In an alternate embodiment, at least 40% of length 6702 of solder tab 6614 is laterally adjacent to at least 40% of length 6704 of solder tab 6620. An end of winding 6602 extending from second side 6610 of core 6606 forms a solder tab 6630 suitable for surface mount soldering to a PCB, and an end of winding 6604 extending from first side 6608 of core 6606 forms a solder tab 6632 suitable for surface mount soldering to a PCB. In alternate embodiments, an alternative type of connector, such as a through-hole pin, replaces one or both of solder tabs 6630, 6632.

FIG. 68 is a top plan view of one PCB footprint 6800 that can be used to configure inductor 6600 as a two-turn inductor when installed on a PCB. Footprint 6800 includes pads 6802, 6804, 6806, 6808 for respectively connecting to solder tabs 6614, 6620, 6630, and 6632 of inductor 6600. A PCB trace 6810 electrically couples pads 6802, 6804. Thus, single-turn windings 6602 and 6604 effectively form single-turn sub-windings of a two-turn winding. PCB trace 6810 is relatively short and wide therefore provides low resistance connection between pads 6802, 6804. Accordingly, inductor 6600's configuration promotes a low resistance series connection between windings when used in a two-turn configuration.

The configuration of solder tabs 6614, 6620 also promotes efficient use of winding material, such as copper foil. For example, FIG. 69A shows one example of how solder tabs 6902, 6904, which are similar to solder tabs 6614, 6620, respectively, can be formed from a rectangular piece of metal foil 6906, and FIG. 69B shows solder tabs 6902, 6904 after being formed, such as stamped or cut, from metal foil 6906. As evident from FIGS. 69A and 69B, little of foil 6906 is wasted when forming solder tabs 6902, 6904.

Combinations of Features

Features described above as well as those claimed below may be combined in various ways without departing from the scope hereof. The following examples illustrate some possible combinations:

(a1) An inductor may include: (1) a magnetic core including first and second end magnetic elements and first and second legs each connected to at least one respective portion of both of the first and second end magnetic elements; (2) first and second windings each wound around the first leg, a first end of the first winding forming a first solder tab on a bottom surface of the first leg, a first end of the second winding forming a second solder tab on the bottom surface of the first leg; and (3) third and fourth windings each wound around the second leg, a first end of the third winding forming a third solder tab on a bottom surface of the second leg, a first end of the fourth winding forming a fourth solder tab on the bottom surface of the second leg.

(a2) In the inductor denoted as (a1), the first solder tab may have a first elongated portion adjacent to a second elongated portion of the second solder tab.

(a3) In the inductors denoted as (a1) or (a2), the first and second solder tabs may extend away from opposite outer sides of the first leg.

(a4) In any of the inductors denoted as (a1) through (a3), the third solder tab may have a third elongated portion adjacent to a fourth elongated portion of the fourth solder tab.

(a5) In any of the inductors denoted as (a1) through (a4), the third and fourth solder tabs may extend away from opposite outer sides of the second leg.

(a6) In any of the inductors denoted as (a1) through (a5), a second end of the second winding may extend away from the first leg and towards the second leg.

(a7) In any of the inductors denoted as (a1) through (a6), a second end of the third winding may extend away from the second leg and towards the first leg.

(a8) In any of the inductors denoted as (a1) through (a7), at least one of the windings may be a single-turn winding.

(a9) In any of the inductors denoted as (a1) through (a8), at least one of the windings may have a cross section selected from the group consisting of rectangular cross section and square cross section.

(a10) A supply may include a printed circuit board, any one of the inductors denoted as (a1) through (a9), a first printed circuit board trace electrically coupling the first and second solder tabs of the inductor, and a second printed circuit board trace electrically coupling the third and fourth solder tabs of the inductor.

(a11) The power supply denoted as (a1) may further include a first switching circuit for switching a second end of the second winding between at least two different voltages, and a second switching circuit for switching a second end of the third winding between at least two different voltages.

(b1) An inductor may include: (1) a magnetic core having a passageway at least partially defined by first and second legs of the magnetic core, the first and second legs opposing each other cross the magnetic core; (2) first and second windings wound around the first leg, a first end of the first winding forming a first solder tab, a first end of the second winding forming a second solder tab, the first solder tab having a first elongated portion adjacent to a second elongated portion of the second solder tab; and (3) third and fourth windings wound around the second leg, a first end of the third winding forming a third solder tab, a first end of the fourth winding forming a fourth solder tab, the third solder tab having a third elongated portion adjacent to a fourth elongated portion of the fourth solder tab.

(b2) In the inductor denoted as (b1), the first and second solder tabs may be disposed on a bottom surface of the first leg, and the third and fourth solder tabs may be disposed on a bottom surface of the second leg.

(b3) In the inductors denoted as (b1) or (b2), the first and second solder tabs may extend away from opposite outer sides of the first leg, and the third and fourth solder tabs may extend away from opposite outer sides of the second leg.

(b4) In any of the inductors denoted as (b1) through (b3), at least one of the windings may be a single-turn winding.

(b5) A supply may include a printed circuit board, any one of the inductors denoted as (b1) through (b4), a first printed circuit board trace electrically coupling the first and second solder tabs of the inductor, and a second printed circuit board trace electrically coupling the third and fourth solder tabs of the inductor.

(b6) The power supply denoted as (b5) may further include a first switching circuit for switching a second end of the second winding between at least two different voltages, and a second switching circuit for switching a second end of the third winding between at least two different voltages.

(c1) An inductor may include: (1) a magnetic core, including first and second end magnetic elements and first and second legs each connected to at least one respective portion of both the first and second end magnetic elements; (2) a first winding wound around the first leg, a first end of the first winding forming a first solder tab on a bottom surface of the first leg; and (3) a second winding wound around the second leg, a first end of the second winding forming a second solder tab on the bottom surface of the first leg.

(c2) In the inductor denoted as (c1), the first solder tab may have a first elongated portion adjacent to a second elongated portion of the second solder tab.

(c3) In the inductors denoted as (c1) or (c2), a second end of the first winding may form a third solder tab on a bottom surface of the second leg, and a second end of the second winding may form a fourth solder tab on the bottom surface of the second leg.

(c4) Any of the inductors denoted as (c1) through (c3) may further include a third winding wound around the first leg and a fourth winding wound around the second leg.

(c5) In the inductor denoted as (c4), a second end of the second winding may a fourth solder tab on a bottom surface of the second leg, a first end of the third winding may form a fifth solder tab on the bottom surface of the second leg, a second end of the third winding may form a sixth solder tab on the bottom surface of the first leg, and a first end of the fourth winding may form a seventh solder tab on the bottom surface of the first leg.

(c6) In the inductor denoted as (c5), the fourth solder tab may have a fourth elongated portion adjacent to a fifth elongated portion of the fifth solder tab, and the sixth solder tab may have a sixth elongated portion adjacent to a seventh elongated portion of the seventh solder tab.

(c7) In any of the inductors denoted as (c1) through (c6) at least one of the windings may be a single-turn winding.

(c8) In any of the inductors denoted as (c1) through (c7), at least one of the windings may have a cross section selected from the group consisting of a square cross section and a rectangular cross section.

(c9) A power supply may include a printed circuit board, any one of the inductors denoted as (c1) through (c9) and a first printed circuit board trace electrically coupling the first and second solder tabs of the inductor.

(c10) The power supply denoted as (c9) may further include a first switching circuit for switching a second end of the first winding between at least two different voltages.

(d1) An inductor may include: (1) a magnetic core having a first outer side, a second outer side opposite to the first outer side, and a bottom side between the first and second outer sides; (2) a first winding wound around at least a portion of the magnetic core, a first end of the first winding wrapping around the first outer side of the magnetic core to form a first solder tab on the bottom side of the magnetic core, the first solder tab having an axis of elongation parallel to a lengthwise direction of the first outer side of the magnetic core; and (3) a second winding wound around at least a portion of the magnetic core, a first end of the second winding wrapping around the second outer side of the magnetic core to form a second solder tab on the bottom side of the magnetic core, the second solder tab having an axis of elongation parallel to a lengthwise direction of the second outer side of the magnetic core.

(d2) In the inductor denoted as (d1), the first solder tab may have a first elongated portion adjacent to a second elongated portion of the second solder tab.

(d3) In the inductors denoted as (d1) or (d2), at least one of the windings may be a single-turn winding.

(d4) A power supply may include a printed circuit board, any one of the inductors denoted as (d1) through (d3), and printed circuit board trace electrically coupling the first and second solder tabs of the inductor.

(d5) The power supply denoted as (d4) may further include a first switching circuit for switching a second end of the first winding between at least two different voltages.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A power supply, comprising:
   a printed circuit board; and
   an inductor, including:
   a magnetic core having a first outer side, a second outer side opposite to the first outer side, and a bottom side between the first and second outer sides, the first outer side separated from the second outer side in a widthwise direction;
   a first winding wound around at least a portion of the magnetic core, a first end of the first winding wrapping around the first outer side of the magnetic core to form a first solder tab on the bottom side of the magnetic core, the first solder tab having an axis of elongation parallel to a lengthwise direction, the lengthwise direction being orthogonal to the widthwise direction; and
   a second winding wound around at least a portion of the magnetic core, a first end of the second winding wrapping around the second outer side of the magnetic core to form a second solder tab on the bottom side of the magnetic core, the second solder tab having an axis of elongation parallel to the lengthwise direction; and
   a trace of the printed circuit board electrically coupling the first and second solder tabs.

2. The power supply of claim 1, each of the windings being single-turn windings.

3. The power supply of claim 2, further comprising a first switching circuit for switching a second end of the first winding between at least two different voltages.

4. A power supply, comprising:
   a printed circuit board;
   an inductor affixed to the printed circuit board, the inductor including:
   a magnetic core having a first side opposite a second side,
   a first foil winding passing through the magnetic core from the first side to the second side, a first end of the first foil winding extending from the first side of the core and wrapping under the core to form a first solder tab under the core surface mount soldered to the printed circuit board, a second end of the first foil winding extending from the second side of the core to form a second solder tab surface mount soldered to the printed circuit board, and
   a second foil winding passing through the magnetic core from the first side to the second side, a first end of the second foil winding extending from the second side of the core and wrapping under the core to form a third solder tab under the core surface mount soldered to the printed circuit board, a second end of the second foil winding extending from the first side of the core to form a fourth solder tab surface mount soldered to the printed circuit board,
   a portion of the first solder tab being laterally adjacent to a portion of the third solder tab under the magnetic core, the first and third solder tabs being electrically connected by a first trace of the printed circuit board; and
   a switching circuit affixed to the printed circuit board and electrically connected to the second solder tab by a second trace of the printed circuit board, the switching circuit configured and arranged to switch the second solder tab between at least two different voltages.

5. The power supply of claim 4, wherein:
   the switching circuit is configured and arranged to switch the second solder tab between an input voltage and a return node; and
   the printed circuit board, the inductor, and the switching circuit form part of a buck converter.

* * * * *